US012247431B2

(12) United States Patent
Lessard et al.

(10) Patent No.: US 12,247,431 B2
(45) Date of Patent: Mar. 11, 2025

(54) DOOR MOVEMENT SYSTEM FOR CABINET

(71) Applicant: CARTER-HOFFMANN LLC, Mundelein, IL (US)

(72) Inventors: Carol Lessard, Menominee, MI (US); Kelly Michalko, Menominee, MI (US)

(73) Assignee: CARTER-HOFFMANN LLC, Mundelein, IL (US)

( * ) Notice: Subject to any disclaimer, the term of this patent is extended or adjusted under 35 U.S.C. 154(b) by 633 days.

(21) Appl. No.: 17/237,353

(22) Filed: Apr. 22, 2021

(65) Prior Publication Data

US 2021/0332635 A1 Oct. 28, 2021

Related U.S. Application Data

(60) Provisional application No. 63/015,931, filed on Apr. 27, 2020, provisional application No. 63/159,175, filed on Mar. 10, 2021.

(51) Int. Cl.
*E05F 15/73* (2015.01)
*E05B 47/00* (2006.01)
(Continued)

(52) U.S. Cl.
CPC .......... *E05F 15/73* (2015.01); *E05B 47/0012* (2013.01); *E05F 15/611* (2015.01);
(Continued)

(58) Field of Classification Search
CPC ......... E05F 15/73; E05F 15/611; E05F 15/63; E05F 2015/631; E05B 47/0012; E05Y 2201/22; E05Y 2900/20
(Continued)

(56) References Cited

U.S. PATENT DOCUMENTS 3,180,519 A 4/1965 Schreiber
4,094,440 A 6/1978 Lotspeich
(Continued)

FOREIGN PATENT DOCUMENTS

CN 1079474 12/1993
CN 107076502 8/2017
(Continued)

OTHER PUBLICATIONS

Examination Report issued in Appl. No. AU2021263319 (Jun. 3, 2022).
(Continued)

*Primary Examiner* — Rakesh Kumar
(74) *Attorney, Agent, or Firm* — Barnes & Thornburg LLP

(57) ABSTRACT

A system for opening and closing a door within a cabinet is provided. The system includes a motor in communication with a controller to automatically open and close a door. A first plate fixed to the motor shaft to rotate with rotation of the motor shaft, the plate comprises a slot disposed therein. A first leg extends from a door that extends through the slot. A second leg extends from the door. A first sensor moves based upon rotation of the motor shaft, wherein the first sensor can detect relative motion between the motor shaft and the door, wherein when the motor shaft is rotated in the second direction and the first sensor detects relative motion between the motor shaft and the door, the first sensor sends a signal to the controller, wherein upon receipt of the signal the first sensor discontinues sending the second signal to the motor.

26 Claims, 29 Drawing Sheets

(51) Int. Cl.
*E05F 15/611* (2015.01)
*E05F 15/63* (2015.01)

(52) U.S. Cl.
CPC ........ *E05F 15/63* (2015.01); *E05F 2015/631* (2015.01); *E05Y 2201/22* (2013.01); *E05Y 2900/20* (2013.01)

(58) Field of Classification Search
USPC ........................................................... 221/12
See application file for complete search history.

(56) References Cited

U.S. PATENT DOCUMENTS 4,231,191 A 11/1980 Ellmore
4,319,169 A * 3/1982 Kucharczyk .......... E05F 15/603 318/467
4,475,312 A 10/1984 Deutschle
4,791,411 A * 12/1988 Staar .................... G06Q 10/087 340/568.1
4,794,731 A 1/1989 Willmott
4,836,352 A 6/1989 Tateno et al.
4,894,717 A 1/1990 Komei
5,169,222 A 12/1992 Bollore et al.
5,223,829 A 6/1993 Watabe
5,346,297 A * 9/1994 Colson, Jr. .............. E05B 65/46 312/215
5,467,892 A 11/1995 Schlamp
5,520,450 A 5/1996 Colson, Jr. et al.
5,728,999 A * 3/1998 Teicher .................. G07F 11/30 235/380
5,909,823 A 6/1999 Ranft
5,929,580 A 7/1999 Mullet
6,057,254 A 5/2000 Bender et al.
6,076,023 A 6/2000 Sato
6,161,438 A 12/2000 Mullet
6,173,532 B1 1/2001 Beausoleil
6,464,142 B1 * 10/2002 Denenberg ............. B65G 1/137 235/462.46
6,494,342 B1 12/2002 Wittern
6,791,450 B2 9/2004 Gokcebay et al.
6,879,243 B1 4/2005 Booth et al.
6,895,241 B2 5/2005 Hara
6,999,825 B2 2/2006 Inomata
7,068,149 B2 6/2006 Lee et al.
7,295,110 B2 11/2007 Mercier et al.
7,323,967 B2 1/2008 Booth et al.
7,366,681 B2 4/2008 Carter
7,401,710 B2 * 7/2008 Black, Jr. ................ G07F 11/16 221/92
7,477,132 B2 1/2009 Mayer et al.
7,909,206 B2 3/2011 Davis, Jr.
8,215,520 B2 7/2012 Miller
8,229,802 B2 7/2012 Dean
8,387,823 B2 3/2013 Davis, Jr.
8,434,838 B2 5/2013 Zabbatino
8,442,878 B2 5/2013 Dean
8,496,308 B2 7/2013 Zabbatino
8,698,596 B2 4/2014 Rudduck et al.
8,829,365 B1 9/2014 Wallace
8,969,744 B2 3/2015 He
9,045,923 B2 6/2015 Dariusz
9,052,992 B2 6/2015 Irwin et al.
9,082,247 B2 7/2015 Turner et al.
9,208,635 B2 12/2015 Fitzgerald et al.
9,223,315 B2 12/2015 Irwin et al.
9,322,207 B2 4/2016 Savage et al.
9,355,220 B2 5/2016 Paydar et al.
9,412,086 B2 8/2016 Morse et al.
9,504,344 B2 11/2016 Sarvestani et al.
9,558,608 B2 1/2017 Amdahl
9,576,418 B2 2/2017 Fitzgerald et al.
9,645,007 B2 5/2017 Wallace
9,663,974 B2 5/2017 Savage et al.
9,706,835 B2 7/2017 Zaniker et al.
9,733,647 B2 8/2017 Irwin et al.
9,745,130 B1 * 8/2017 Rawal ................ G06Q 10/0875
9,772,217 B2 9/2017 Wallace
9,852,567 B2 12/2017 Hild et al.
9,953,479 B1 4/2018 Sawant et al.
9,959,692 B2 5/2018 Hild et al.
9,959,698 B2 5/2018 Fitzgerald et al.
10,043,151 B1 8/2018 Zhu et al.
10,062,257 B2 8/2018 Chau
10,074,068 B2 9/2018 Irwin et al.
10,096,183 B2 10/2018 Nitu et al.
10,117,536 B2 11/2018 Peynet
10,197,326 B2 2/2019 Son et al.
10,268,804 B2 4/2019 Paydar et al.
10,280,650 B2 5/2019 Duval
10,281,931 B2 5/2019 Irwin et al.
10,295,400 B2 5/2019 Wallace
10,320,582 B1 6/2019 Wallace
10,327,583 B2 6/2019 Hiatt
10,380,546 B2 8/2019 Chau
10,424,143 B2 9/2019 Miller et al.
10,424,144 B2 9/2019 Carstens et al.
10,435,937 B2 10/2019 Savage et al.
10,473,516 B2 11/2019 Wallace
10,474,797 B2 11/2019 Lowenthal et al.
10,480,990 B1 11/2019 Wallace
10,482,525 B2 11/2019 Mueller
10,592,860 B2 3/2020 Wallace
10,918,885 B2 2/2021 Haas et al.
10,997,813 B2 5/2021 Zhang
11,222,499 B2 1/2022 Mason
11,615,667 B2 * 3/2023 Gokcebay .......... G07C 9/00944 232/24
11,640,743 B2 5/2023 Xu
11,690,924 B1 * 7/2023 Gokcebay .......... G07C 9/00896 250/455.11
11,749,040 B2 * 9/2023 Gokcebay ................. A61L 2/10 250/455.11
2002/0040564 A1 4/2002 Killingbeck et al.
2002/0180580 A1 12/2002 Gotfried
2004/0015393 A1 1/2004 Fong et al.
2004/0267640 A1 12/2004 Bong et al.
2005/0165612 A1 7/2005 Van Rysselberghe
2005/0205597 A1 9/2005 Collins
2006/0020489 A1 1/2006 Rivalto
2006/0077038 A1 4/2006 Hopkins et al.
2008/0018210 A1 1/2008 Hayes
2009/0179735 A1 7/2009 Van Rysselberghe
2010/0072868 A1 3/2010 Deem
2011/0057774 A1 3/2011 Van Rysselberghe
2011/0094160 A1 4/2011 Houser
2011/0202170 A1 8/2011 Dawes et al.
2012/0086314 A1 4/2012 Bourke et al.
2012/0099255 A1 4/2012 Lee et al.
2012/0200385 A1 * 8/2012 Savage ................ G06Q 10/087 340/5.7
2012/0235786 A1 9/2012 Rudduck et al.
2015/0193733 A1 7/2015 Bouzit-Benbernou
2015/0366377 A1 * 12/2015 Savage .................... H02G 1/00 312/270.3
2016/0047160 A1 * 2/2016 Huynh .................... E05F 15/77 49/140
2016/0066732 A1 * 3/2016 Sarvestani ........... A47G 29/141 232/24
2016/0362928 A1 12/2016 Menze
2017/0055752 A1 3/2017 Mueller
2017/0061373 A1 3/2017 Hara
2017/0311715 A1 11/2017 Zaniker et al.
2018/0033235 A1 2/2018 Dotterweich
2018/0040181 A1 2/2018 Groeger et al.
2018/0078080 A1 3/2018 Drummond
2018/0210468 A1 7/2018 Irwin et al.
2018/0328099 A1 * 11/2018 Whitaker ................ E05F 15/41
2018/0374043 A1 12/2018 Irwin et al.
2019/0047460 A1 2/2019 Goldberg et al.
2019/0051086 A1 2/2019 Goldberg et al.
2019/0051087 A1 2/2019 Goldberg et al.
2019/0051090 A1 2/2019 Goldberg et al.
2019/0066534 A1 2/2019 Wallace

(56) References Cited

U.S. PATENT DOCUMENTS

| | | | |
|---|---|---|---|
| 2019/0114585 A1 | 4/2019 | Fee et al. | |
| 2019/0114859 A1 | 4/2019 | Fee et al. | |
| 2019/0162585 A1 | 5/2019 | Wallace | |
| 2019/0164116 A1 | 5/2019 | Wallace | |
| 2019/0254470 A1 | 8/2019 | Hiatt | |
| 2019/0304238 A1 | 10/2019 | Ambauen | |
| 2019/0370744 A1 | 12/2019 | Fee et al. | |
| 2020/0003000 A1 | 1/2020 | Savage et al. | |
| 2020/0012245 A1 | 1/2020 | Marin | |
| 2020/0043084 A1 | 2/2020 | Young | |
| 2020/0066086 A1 | 2/2020 | Fee et al. | |
| 2020/0072658 A1 | 3/2020 | Wallace | |
| 2021/0264715 A1 | 8/2021 | Zhang | |
| 2021/0332635 A1* | 10/2021 | Lessard | E05F 15/73 |

FOREIGN PATENT DOCUMENTS

| | | | |
|---|---|---|---|
| CN | 107853970 | 3/2018 | |
| CN | 108364147 | 8/2018 | |
| CN | 209153013 U * | 7/2019 | A47G 29/01 |
| CN | 110731680 | 1/2020 | |
| CN | 110947108 | 4/2020 | |
| DE | 4231191 A1 * | 4/1993 | B60R 16/027 |
| EP | 453381 A * | 10/1991 | G07C 9/00039 |
| EP | 2524632 | 11/2012 | |
| EP | 2950283 | 12/2015 | |
| EP | 2862485 | 10/2017 | |
| EP | 3171338 | 11/2019 | |
| WO | 01/33517 | 5/2001 | |
| WO | WO-0133517 A1 * | 5/2001 | A47F 10/02 |
| WO | 00/51750 | 10/2001 | |
| WO | 01/52199 | 2/2002 | |
| WO | 01/78563 | 3/2002 | |
| WO | 03/056490 | 7/2003 | |
| WO | 2006/004967 | 1/2006 | |
| WO | WO-2006004967 A2 * | 1/2006 | E05F 15/63 |
| WO | 2006/034884 | 4/2006 | |
| WO | 2009/018931 | 2/2009 | |
| WO | 2010/118037 | 10/2010 | |
| WO | 2011/127715 | 10/2011 | |
| WO | 2012/034171 | 3/2012 | |
| WO | 2013/020364 | 2/2013 | |
| WO | 2013/148123 | 10/2013 | |
| WO | 2015/039155 | 3/2015 | |
| WO | 2015/109690 | 7/2015 | |
| WO | WO-2016036213 A1 * | 3/2016 | E05F 15/614 |
| WO | 2016/193794 | 12/2016 | |
| WO | 2017/041145 | 3/2017 | |
| WO | 2018/205116 | 11/2018 | |
| WO | 2019/025616 | 2/2019 | |
| WO | 2019/063806 | 4/2019 | |
| WO | 2019/135080 | 7/2019 | |

OTHER PUBLICATIONS

Examination Report issued in Appl. No. EP21724163.7 (Mar. 15, 2023).

Extended Search Report issued in Appl. No. EP22210380.6 (Mar. 21, 2023).

Search Report & Written Opinion issued in Int'l Appl. No. PCT/US2021/028574 (2021).

Examination Report issued in Appl. No. AU2023200514 (Feb. 13, 2024).

Examination Report issued in Appl. No. AU2023200513 (Feb. 8, 2024).

Non-Final Office Action issued in U.S. Appl. No. 17/308,358 (Dec. 19, 2023).

Non-Final Office Action issued in U.S. Appl. No. 18/116,623 (Feb. 29, 2024).

Non-Final Office Action issued in U.S. Appl. No. 18/116,628 (Jan. 5, 2024).

English Translation of Office Action issued in CN 202180007481.7 (Mar. 29, 2024).

Final Office Action issued in U.S. Appl. No. 17/308,358 (Jul. 10, 2024).

Final Office Action issued in U.S. Appl. No. 18/116,628 (Jul. 10, 2024).

Final Office Action from U.S. Appl. No. 18/116,623 (Sep. 6, 2024).

Notice of Allowance from U.S. Appl. No. 18/116,628 (Oct. 29, 2024).

Examination Report issued in Appl. No. 2022204615 (Aug. 12, 2022).

YouTube, "How To Make A Roll Up Door," accessed on-line at: <https://www.youtube.com/watch?v=fCt9wdiWEJ4> (Nov. 28, 2019).

* cited by examiner

DOOR MOVEMENT SYSTEM FOR CABINET

CROSS-REFERENCE TO RELATED APPLICATIONS

This application claims priority from U.S. Provisional Application No. 63/015,931, filed on Apr. 27, 2020, and from U.S. Provisional Application No. 63/159,175, filed on Mar. 10, 2021, the entirety of each are hereby fully incorporated by reference herein.

BACKGROUND

The subject disclosure relates to cabinets that are configured to hold items for future automated delivery to an end user or a customer. Cabinets include storage compartments and are frequently used in restaurants for holding food items that have already been prepared after a customer's order that are disposed therein for the customer's pickup at a later time. Cabinets have many different uses but are often seen as beneficial ways to allow for delivery of orders to customers in an efficient manner, due to the lack of a need for a restaurant employee to give the prepared item to the customer directly, instead a restaurant employee can position the prepared item into a compartment, close the compartment's door and then send a message to the customer that the item is ready for pick up by the customer. The customer is often provided with a code to enter into the cabinet that allows the customer to access the compartment. Some conventional cabinets have systems to monitor the front portion of the cabinet to confirm that there isn't anything blocking the path of the door to the compartment. These systems often add undesired cost, complexity, and likelihood of failure to the design of the cabinet. The subject disclosure is provided to provide the cabinet with the safety aspect of the conventional monitor systems with a greater reliability and at a lower cost.

BRIEF SUMMARY

A first representative embodiment of the disclosure is provided. The embodiment includes a cabinet with a plurality of storage compartments. The cabinet includes a housing comprising a plurality of walls that define two or more compartments to receive items therein. Two or more doors are rotatably mounted to the housing with the plurality of doors selectively enclosing or opening the respective two or more compartments and two or more motor assemblies are each operably connected between one or more of the plurality of walls and a respective door. Each motor assembly includes a motor shaft, the motor fixed to the one or more of the plurality of walls, the motor in communication with a controller wherein the motor is configured to rotate the motor shaft in a first direction upon receipt of a first signal from the controller and the motor is configured to rotate the motor shaft in a second direction upon receipt of a second signal from the controller, wherein rotation of the motor shaft in the first direction causes the respective door to move in a direction associated with transferring the door from a closed position toward an open position and wherein rotation of the motor shaft in the second direction causes the door to move in a direction associated with transferring the door from the open position toward the closed position. A first plate is fixed to the motor shaft to rotate with rotation of the motor shaft, the plate comprises a slot disposed therein. A first leg extends from the respective door that extends through the slot. A second leg that extends from the respective door. A first sensor moves based upon rotation of the motor shaft, wherein the first sensor can detect relative motion between the motor shaft and the respective door, wherein when the motor shaft is rotated in the second direction and the first sensor detects relative motion between the motor shaft and the door, the first sensor sends a signal to the controller, wherein upon receipt of the signal the first sensor discontinues sending the second signal to the motor.

Another representative embodiment of the disclosure is provided. The embodiment includes a system for opening and closing a door within a cabinet. The system includes a motor supported upon one or more walls of a cabinet, the motor comprising a motor shaft, the motor in communication with a controller wherein the motor is configured to rotate the motor shaft in a first direction upon receipt of a first signal from the controller and the motor is configured to rotate the motor shaft in a second direction upon receipt of a second signal from the controller, wherein rotation of the motor shaft in the first direction causes a door to move in a direction associated with transferring the door from a closed position toward an open position and wherein rotation of the motor shaft in the second direction causes the door to move in a direction associated with transferring the door from the open position toward the closed position. A first plate is fixed to the motor shaft to rotate with rotation of the motor shaft, the plate comprises a slot disposed therein. A first leg extends from a door that extends through the slot. A second leg extends from the door. A first sensor that moves based upon rotation of the motor shaft, wherein the first sensor can detect relative motion between the motor shaft and the door, wherein when the motor shaft is rotated in the second direction and the first sensor detects relative motion between the motor shaft and the door, the first sensor sends a signal to the controller, wherein upon receipt of the signal the first sensor discontinues sending the second signal to the motor.

Advantages of the present disclosure will become more apparent to those skilled in the art from the following description of the preferred embodiments of the disclosure that have been shown and described by way of illustration. As will be realized, the disclosed subject matter is capable of other and different embodiments, and its details are capable of modification in various respects. Accordingly, the drawings and description are to be regarded as illustrative in nature and not as restrictive.

DETAILED DESCRIPTION OF THE PREFERRED EMBODIMENTS

Figure 1:
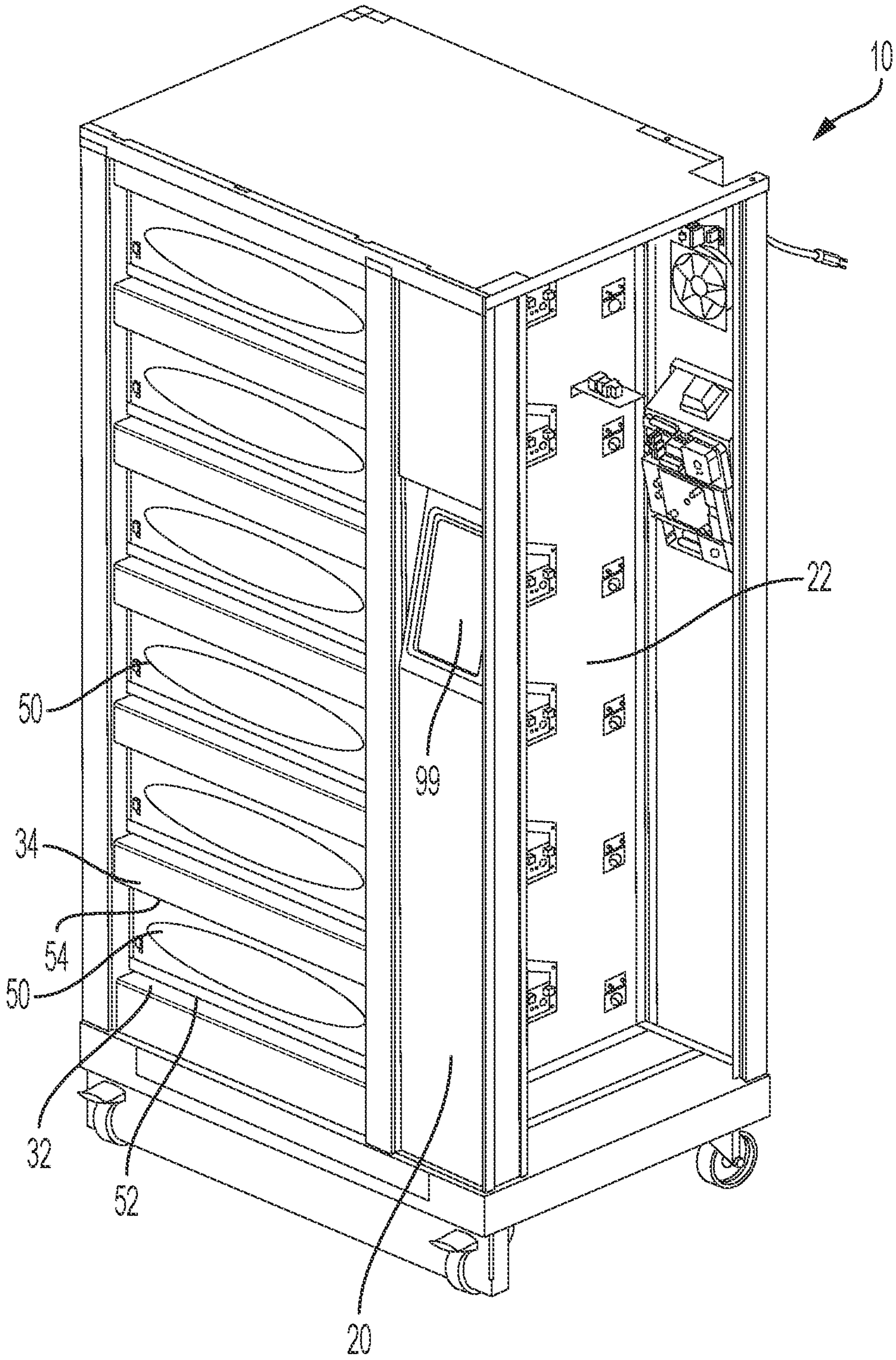
FIG. 1 is a perspective view of a cabinet with a plurality of compartments and doors to selectively close and allow access to each of the compartments individually, with a side panel of the housing of the compartment removed.

Turning now to FIGS. 1-16, a cabinet 10 with a plurality of compartments 20 for enclosed storage is provided. The cabinet 10 disclosed and depicted herein is specifically designed for receiving food items for holding for customer pickup based upon previous orders, either at the facility or by remote ordering, e.g. via the internet or via an app. The cabinet 10 is specifically discussed herein for use with food products, normally packed food products or cooked food products in containers that are ready to picked up by a customer either at a restaurant, grocery store, or the like or at a remote location, but one of ordinary skill in the art will easily comprehend with a thorough review of this specification and figures that the cabinet 10 may be used non-food items, such as products sold by stores, prescription drugs from a pharmacy, individualized papers, and the like. One of skill in the art with a thorough review of this disclosure will readily comprehend how the cabinet 10 may be used for various items for holding and pick up by a customer The cabinet 10 may be configured to be located at a restaurant facility for holding and pick up of ordered cooked/processed at the restaurant facility, or the cabinet 10 may be disposed at a location remote from the restaurant facility but convenient for customers, such as to allow for a delivery service to position the item(s) within a compartment 20 (which can be enclosed by a door 50) with the customer able to remove the items from the compartment at a convenient time for the customer. The cabinet 10 may be adapted for a delivery service, or a restaurant directly, to deposit packaged food items into a selected compartment 20, with a customer above to open the door 50 to the compartment and remove the items from the compartment 20 without any physical contact with the housing or the input device 99 of the cabinet. Similarly, the cabinet 10 may be made of materials and components, or components that may be touched by a user with surface coatings, which do not readily accept or retain biological material from a person that touches the component, or breathes, or coughs upon the components, or the like, or may be configured to prevent or minimize release of biological material received upon a surface thereof to another who later makes physical contact or comes into close proximity to the component.

The cabinet 10 may include a heating system that heats one, some, or all of the plurality of compartments 20. The heating system may be via electrical resistance heaters or by other heating means. Additionally or alternatively, the cabinet 10 may include a refrigeration or cooling system for one, some or all of the plurality of compartments. In some embodiments, the cabinet 10 may include forced ventilation to allow for mixing of the heat generated by the heating system and/or cooling.

The cabinet 10 may be configured to selectively automatically open and close the doors 50 individually (as discussed below with each door 50 moved by a motor assembly 100) based upon one of a plurality of inputs. For example, the cabinet 10 may include an input device 99 upon the cabinet that allows for a user to input a code, such as a number or a password to open the door associated with the compartment upon command. Similarly, the input device 99 may have a sensor that is capable of receiving and interpreting or identifying a symbol or code (such as a QR code, UPC symbol, or another automatically generated visual cue) and when received open the associated door 50.

Additionally or alternatively, the cabinet 10 may be configured to automatically open the door 50 associated with the compartment upon receipt of a signal from a remote device, such as a signal generated by a customer's app, a delivery service's app, a restaurant's app, etc. upon a phone, tablet, computer, or another device capable of generating and communicating a signal. For example, the cabinet 10 may include Wi-Fi, cellular, Bluetooth, or other data communications technologies that work wirelessly with a remote server or network, or hard wired connectivity to a server that receives a signal from a remote device associated with the customer.

Figure 1A:
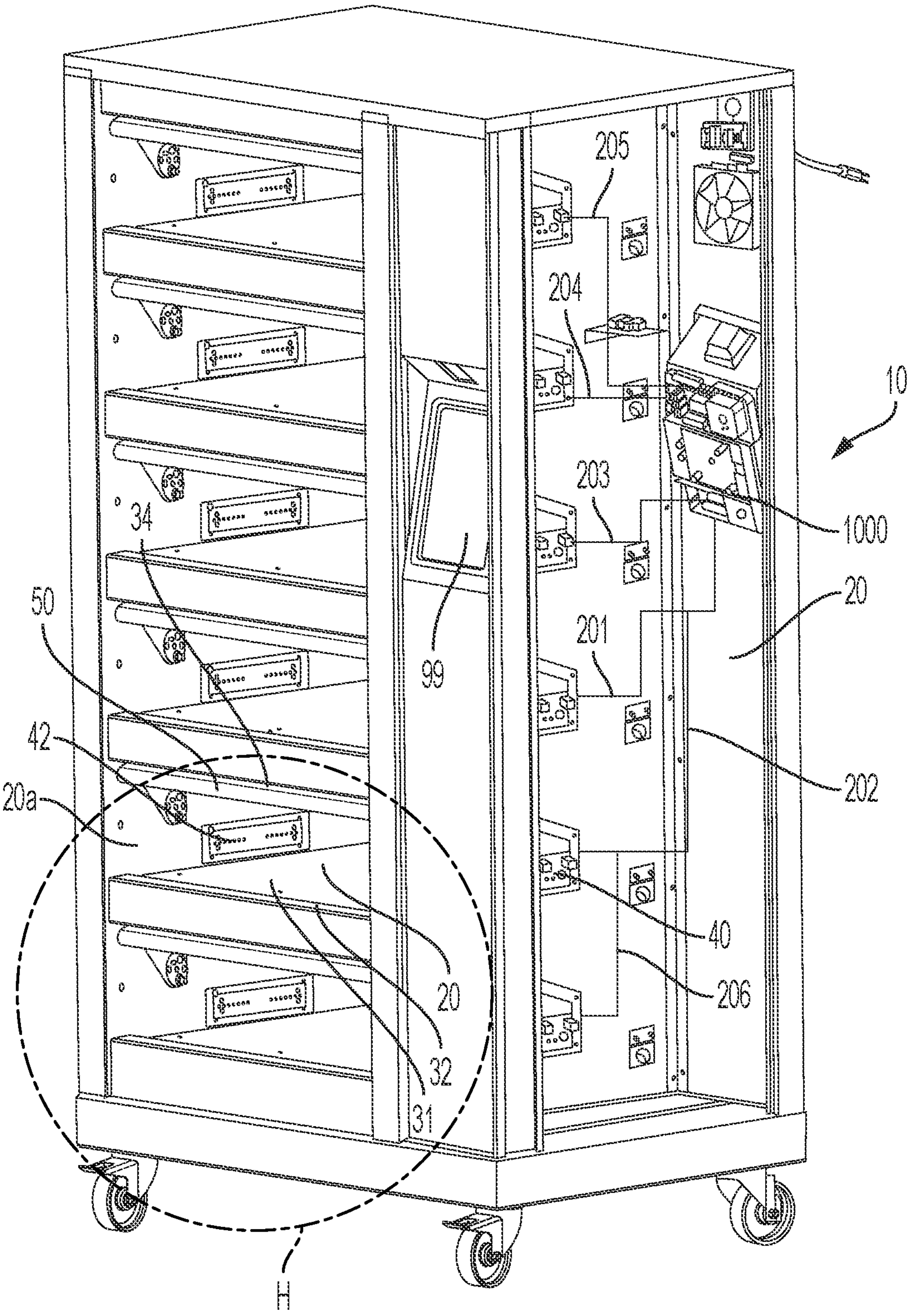
FIG. 1*a* is the view of FIG. 1 with the plurality of doors in the open position.

The cabinet 10 includes a plurality of compartments 20 which are individually enclosed by individual doors 50, as understood with comparison of FIGS. 1 and 1*a*. In some embodiments, the construction of the cabinet 10 allows for the only access to the compartment 20 via an opening 20*a* that is selectively opened or enclosed by the door 50, while in other embodiments, the cabinet may include an opening, such as a back of a cabinet that is open. In this embodiment, the cabinet 10 may be designed to be disposed within a restaurant where a restaurant employee can access the opening to position items within a respective compartment (such as from a location within the restaurant where customers are not normally allowed or present), while customers can only access the compartments when the doors 50 are open. In some embodiments, the compartments 20 may be vertically stacked, such that a ceiling of a compartment forms a floor of the compartment positioned above that compartment. The cabinet may have a single or multiple columns of stacked compartments 20.

Figure 1B:
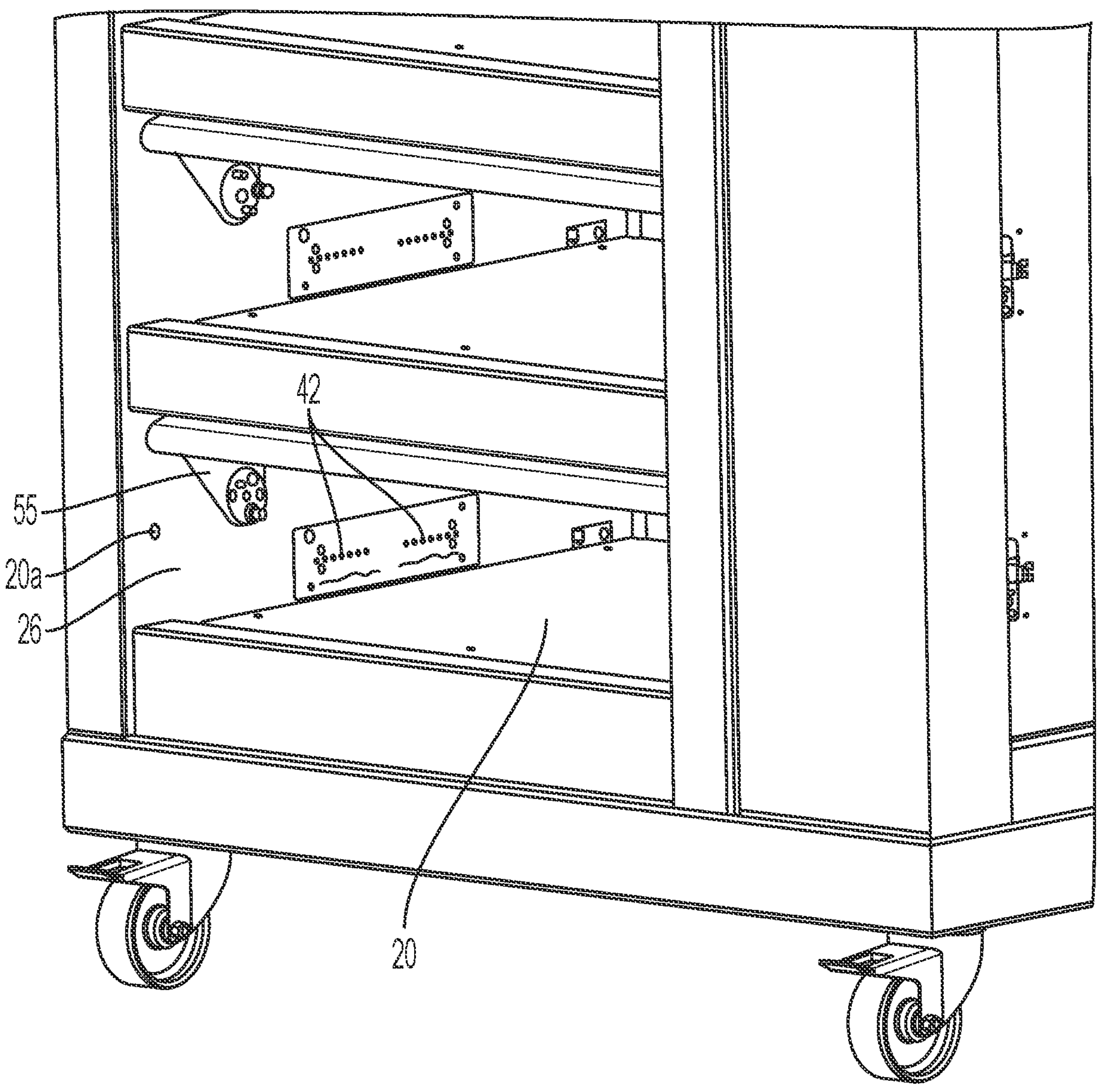
FIG. 1*b* is a detail view of detail H of FIG. 1*a*.
Figure 1C:
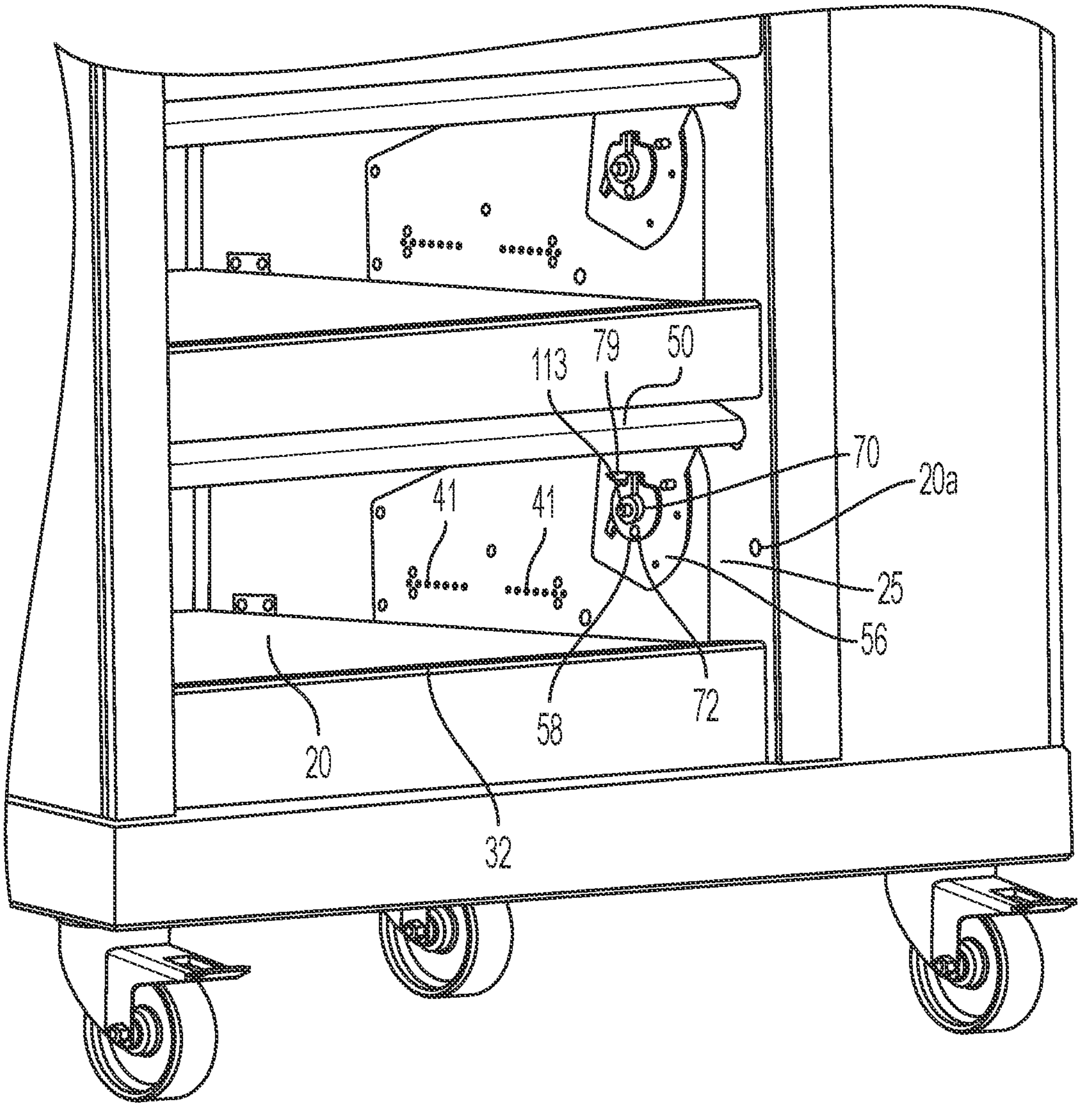
FIG. 1*c* is another front perspective view of the cabinet of FIG. 1, showing an opposite inner side wall from the inner side wall depicted in FIG. 1*b*.
Figure 2:
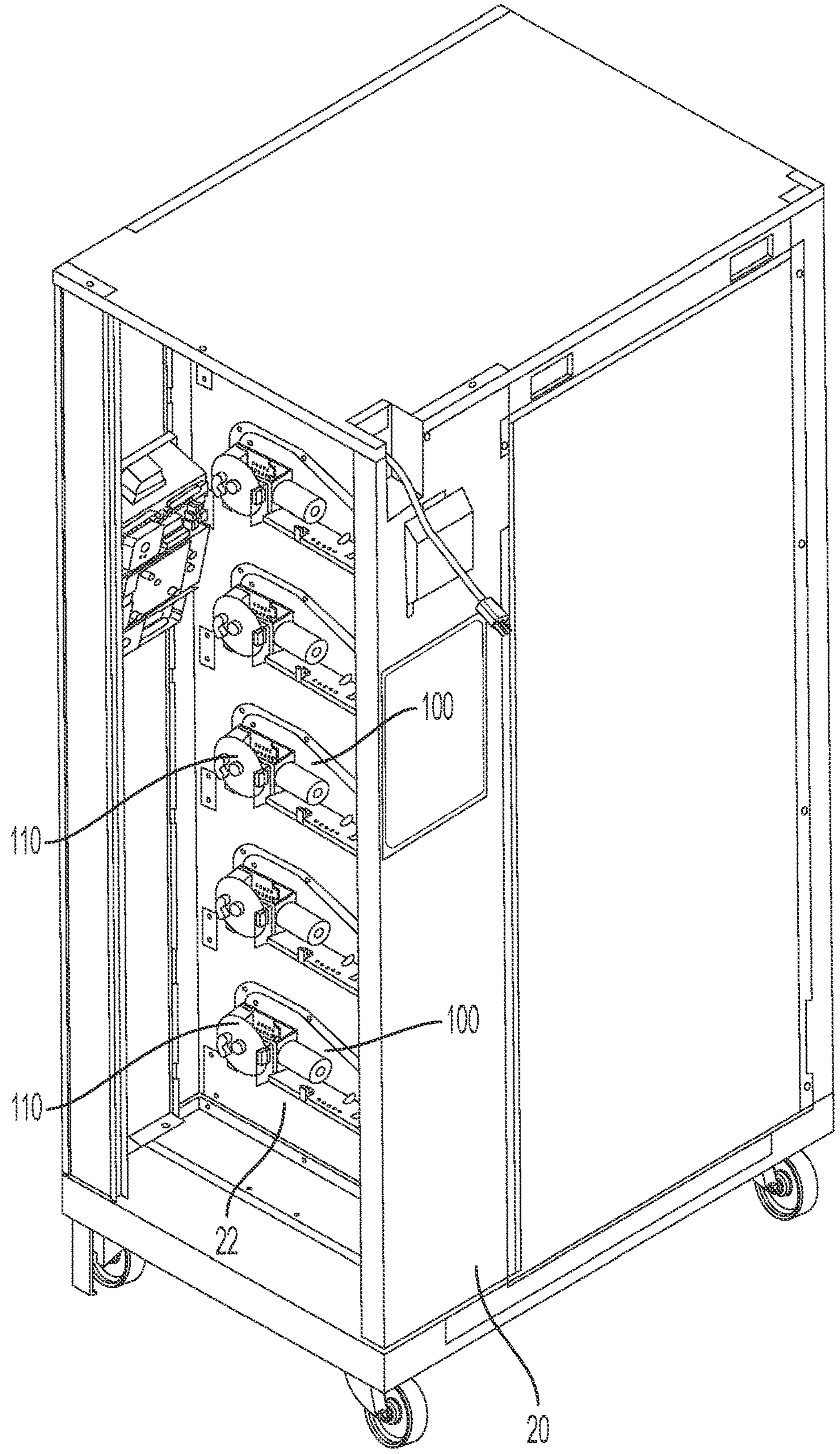
FIG. 2 is a rear perspective view of the view of FIG. 1 showing the plurality of motor assemblies disposed for operating the respective doors for each of the compartments.
Figure 3:
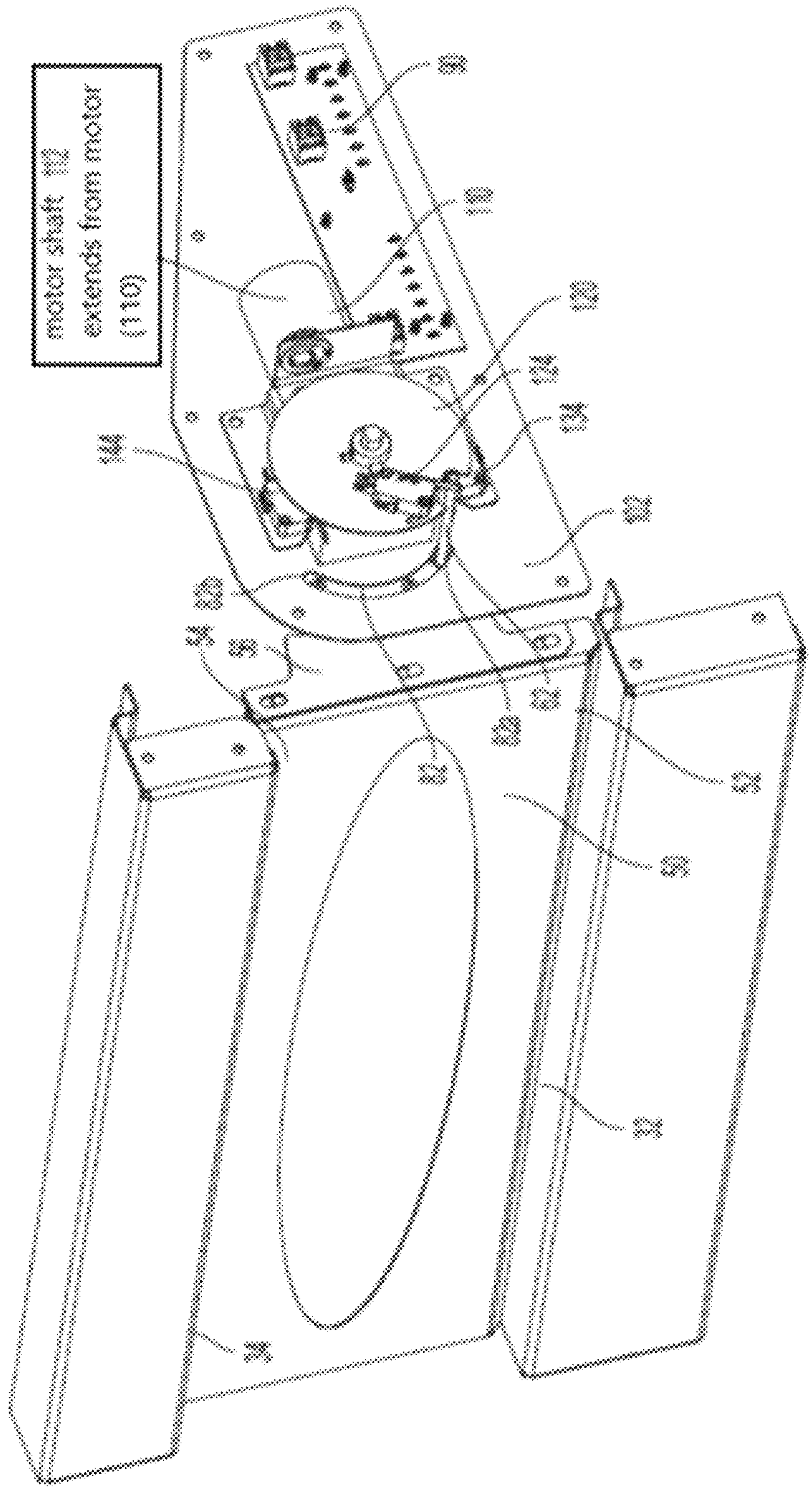
FIG. 3 is a perspective view of a door and motor assembly, with the door in the closed position.

As best shown in FIGS. 1*a*-1*c*, each compartment 20 may include a sensing system 40 that is configured to determine whether the specific compartment 20 has any items, such as food products, disposed therein and available for pickup. In some embodiments, the sensing system 40 may be a system with a transmitter 41 and a receiver 42 that are disposed upon opposite walls within the compartment, such as the opposite right and left walls 25, 26 that define the compartment 20. In some embodiments, the transmitter 41 and the receiver 42 may be a laser, or another type of light source such as a source that operates in the infrared spectrum. As will be understood by one of ordinary skill in the art upon review of this specification, the transmitter and receiver 41, 42 will be blocked when one or more items are disposed upon the floor of the compartment 20 and when the signal is blocked the sensing system 40 sends a signal to the controller 1000. As discussed elsewhere herein, the controller upon receipt of a signal from the sensing system 40 that there are one or more items within the compartment 20, or that there are no items in the compartment, the controller 1000 uses that information to operate the position of the door 50, and also may cause communications to be sent to the restaurant or to the customer, such as to a POS system of the restaurant or to an app of the customer. For example, when the door 50 associated with the compartment that contains the sensing system 40 is in the open position, and the sensing system 40, which had been sending a signal that indicated that one or more items are within the compartment to the controller, but then the controller 1000 receives a signal that there are no items in the compartment, the controller may be programmed to automatically cause the door 50 to move from the open position to the closed position, either immediately or after a predetermined delay time, as discussed below.

In some embodiments the sensing system 40 may be an array of a plurality of adjacent transmitters 41 and receivers 42, or in other embodiments a single transmitter 41 and a plurality of receivers 42. These embodiments with receivers spread to receive signals spaced along the cross-sectional area of the compartment 20 allow for redundancy (i.e. the sensing system for example may not conclude that there is an item within or no items within the compartment) when only a single transmitter receives or does not receive a light beam (for example) from a transmitter, and also will allow the sensing system 40 to identify that items are within the compartment 20 such as when they are positioned relatively close to the opening 20*a* or relatively close to a back wall of the compartment 40. The sensing system 40 may be programmed with logic to determine that there is an item within the compartment, such as for example, when two independent receivers 42 no longer receive the light beam, instead of only a single receiver 42 to allow for continuity of correct operation when a one of the transmitters/receivers no longer operates correctly (due to loss of power, improper alignment of the light beam, or due to other reasons). In the embodiment depicted herein, each compartment 20 includes two sets of transmitters 41*a*, 41*b* that each have seven transmitters, and a corresponding two sets of seven receivers 42*a*, 42*b* that each receive a light from a transmitter.

Figure 4:
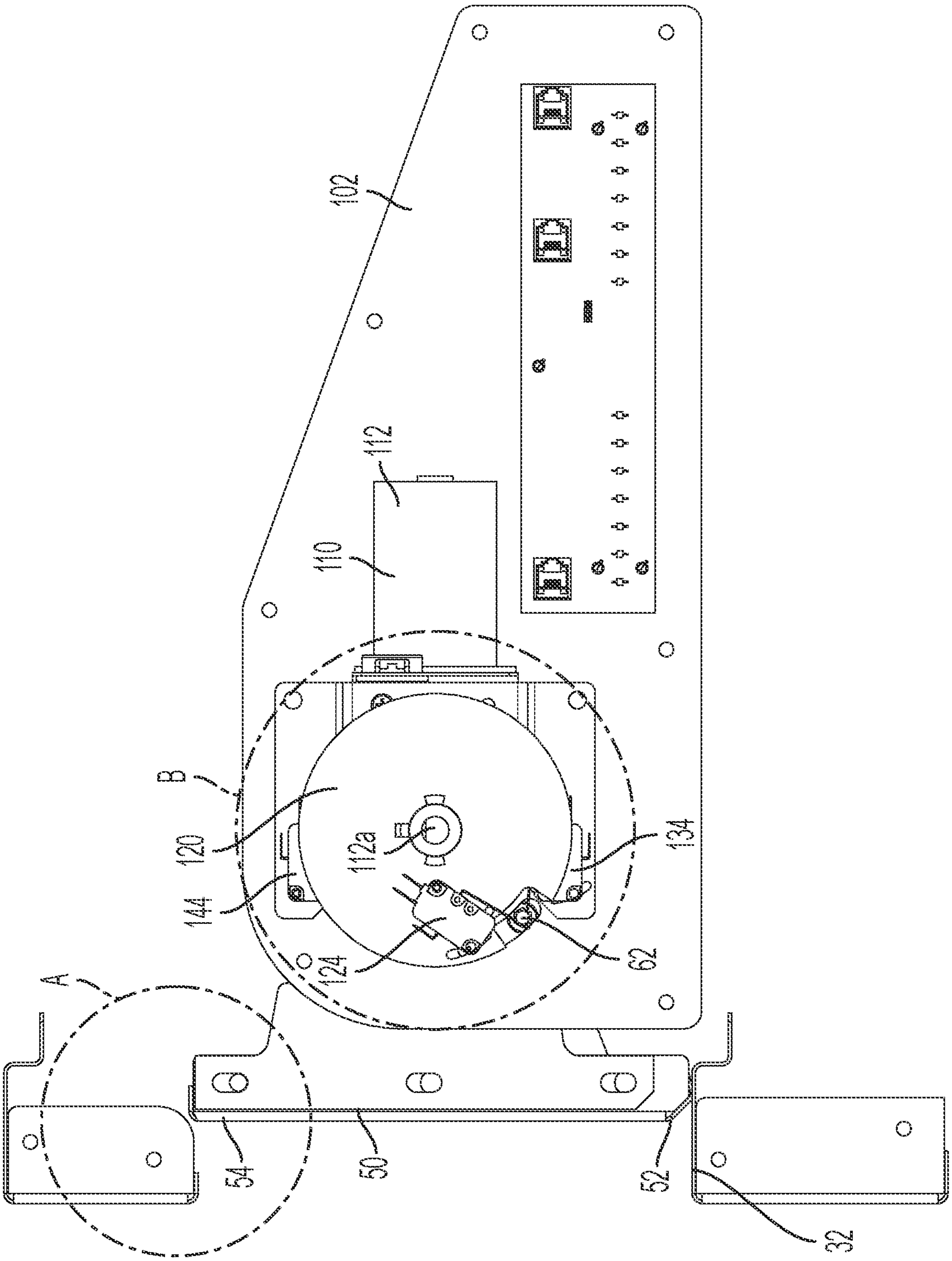
FIG. 4 is a side view of the view of FIG. 3.
Figure 4A:
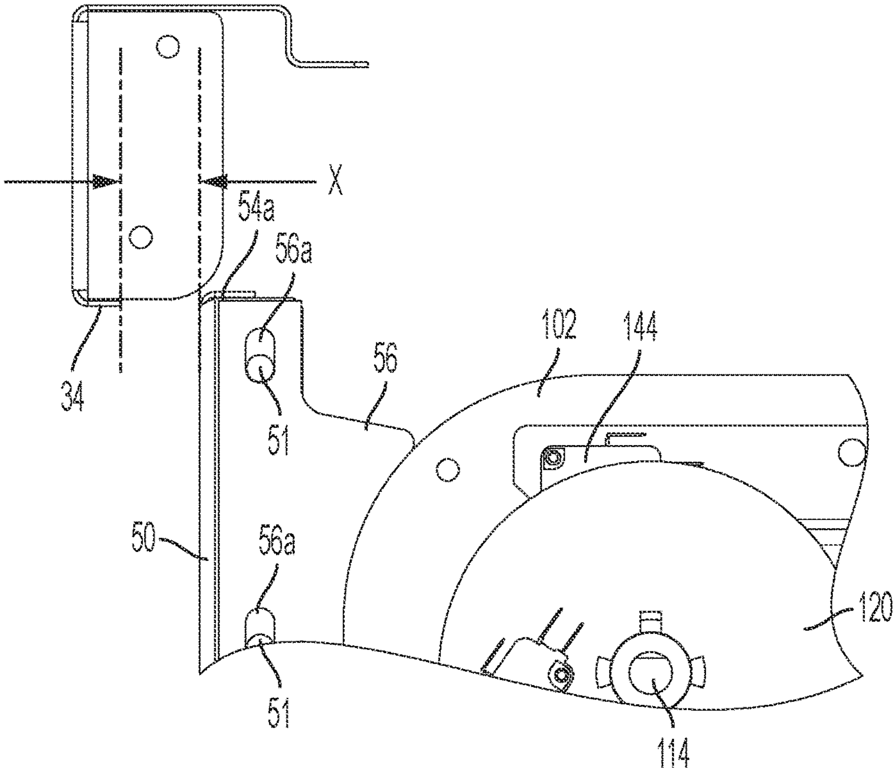
FIG. 4*a* is a detail view of detail A of FIG. 4.
Figure 5:
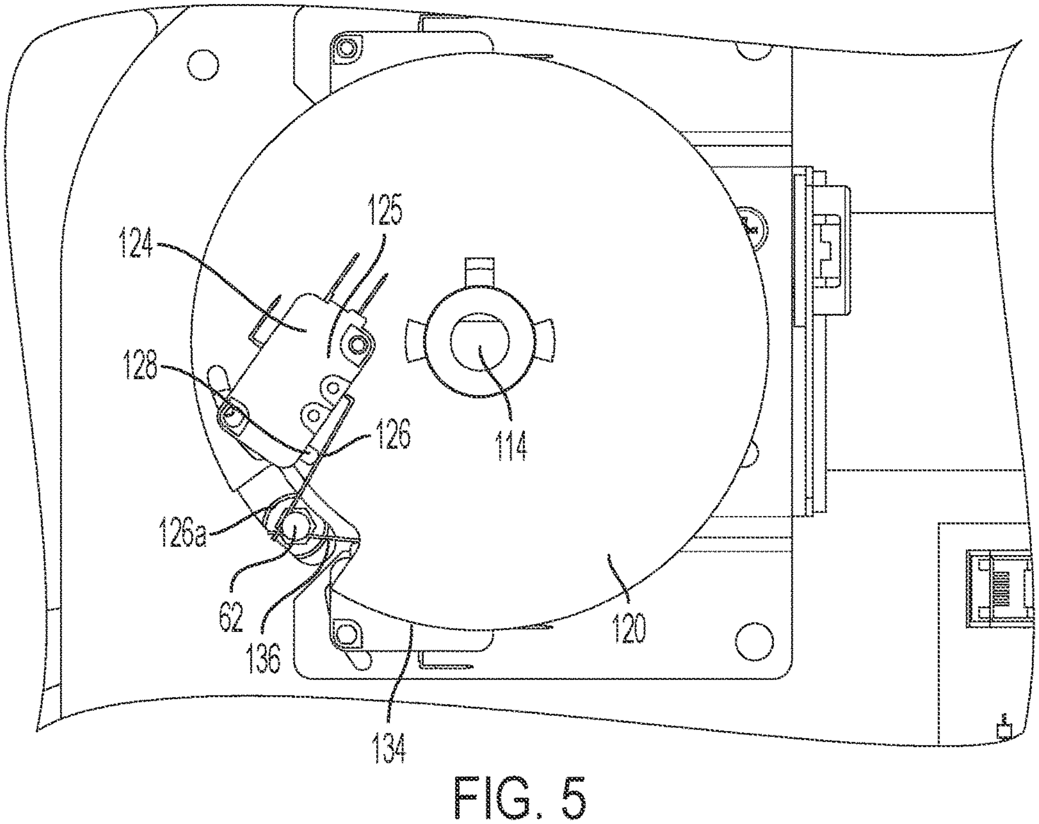
FIG. 5 is a detail view of detail B of FIG. 4.
Figure 8:
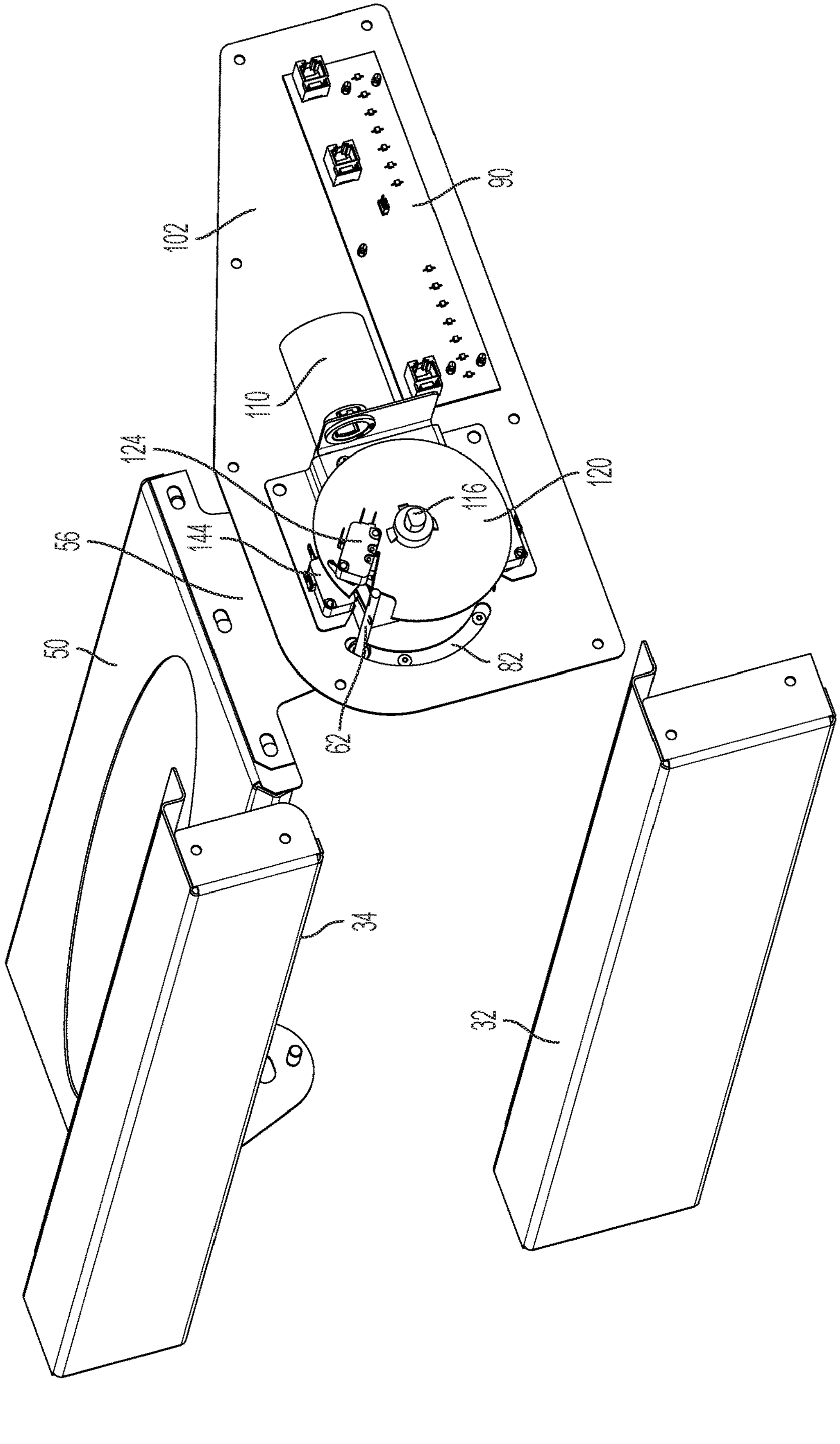
FIG. 8 is the view of FIG. 3 with the door in the open position.
Figure 9:
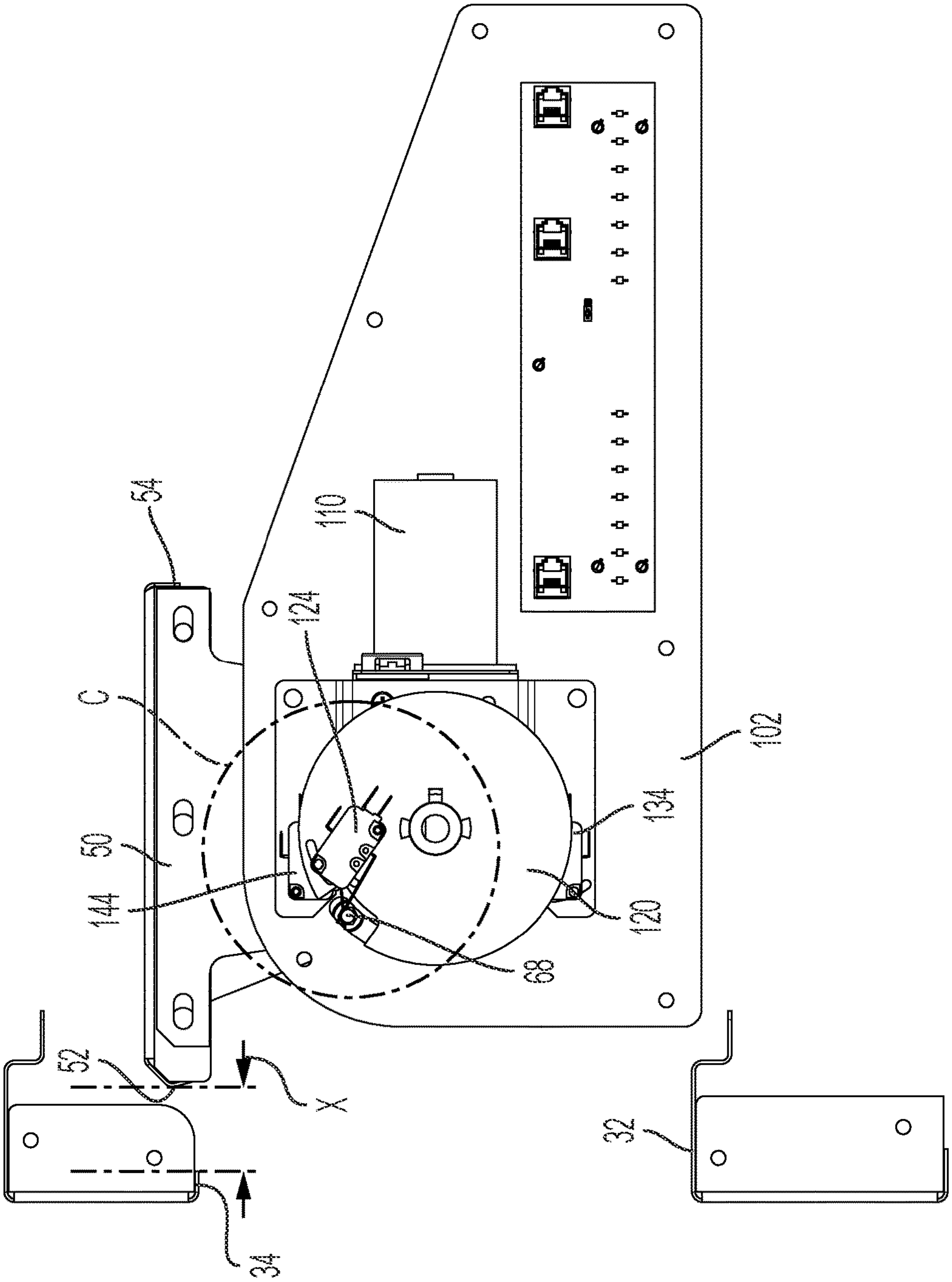
FIG. 9 is a side view of FIG. 8.

As best shown in FIGS. 3, 4, 4*a*, 8, 9, and 12, the door 50 associated with each compartment 20 can be automatically moved (as determined by the controller 1000 as discussed herein) between a closed position (FIGS. 3, 4) and an open position (FIGS. 8, 9). As shown in FIG. 4*a*, when the door 50 is in the closed position, the top edge portion 54, and the top edge 54*a* of the door is spaced from the bottom edge portion 34 that defines the upper bounds of the opening 20*a* in the compartment as designated by distance X and as shown in FIG. 9, when the door is in the open position, the bottom portion 52 is spaced from the bottom edge portion 34, with that spacing maintained (at least) throughout the range of motion of the door 50. This space X, which may be in some embodiments 0.75 inches or in other embodiments within a range of about 0.75 to 2 inches, inclusive of all values within this range, is provided to prevent pinching of items that may extend between the door and the bottom edge portion, to prevent personnel injury if the door 50 is operated when an item (such as a user's finger) is disposed within the space when the door 50 is moved, while being small enough to prevent theft or minimize any reasonable chance of physical disturbance of the contents within the compartment when the door 50 is closed. As discussed below, if in the closing direction the door is prevented from movement the controller 1000 will stop the closing motion of the door 50. The term "about" is specifically defined herein to include the reference value as well as 5% plus or minus the reference value.

In the embodiments depicted and specifically described in this specification, the door 50 contacts the top edge portion 32 of the walls of the compartment when in the closed position. In other embodiments, the door 50 may maintain a small gap between the top edge portion 32 and the bottom edge portion 52 of the door 50 when in the closed position, with the small gap provided to minimize pinching between the door and the top edge portion 32, while preventing theft or minimizing any reasonable chance of physical disturbance of the contents within the compartment 20 when the door 50 is closed.

Each door 50 may be rotatably mounted to the cabinet, and specifically the side walls 25, 26 that form the side walls of the respective compartment 20 with a pinned connector with another rotatable connection as known in the art. Each door 50 includes side panels 55, 56 that extend rearwardly from the door 50 and extend into the respective compartment 50, with the side panels 55, 56 making the pinned or other connection with respect to the side walls.

In some embodiments, a motor assembly 100 is disposed upon one of the side walls that forms the compartment (such as the side wall 25 that neighbors the side panel 56 of the door 50) with the motor assembly 100 being operable to control the motion of the door 50 between the open and closed positions.

The motor assembly 100 may include the following components: a motor 110 that includes a motor shaft 112, an inner plate 70 that is fixed to the motor shaft, first and second door position sensors 134, 144 that are fixed with respect to the side wall 25, and a safety sensor 124 that is fixed with respect to the motor shaft to move along an arc as the motor shaft 112 is rotated. The motor assembly 100 further includes a first leg 58 that extends from the side panel 56 and extends through a slot 72 in the inner plate 70, and a second leg 62 that extends from the side panel 56 and selectively interacts with the first, second, and the safety sensor 134, 144, 124. In some embodiments, the components of the motor assembly (other than the shafts 58, 62 that extend from the door 50) may be fixed upon a rigid plate 102 to allow for precise positioning with respect to each other as well as to allow for efficient assembly of the cabinet by only needing to fix the rigid plate 102 onto the side wall (in a position such that the two legs 58, 62 are properly positioned within and through the correct slots) with a plurality of fasteners and then make needed electrical connections. In some embodiments, the transmitters 41 of the sensing system 40 may also be positioned upon the rigid plate for ease of assembly of the cabinet 10.

The motor 110 may a DC or an AC motor that is capable of rotating its shaft 112 in either rotation direction based upon receipt of a first signal (first direction, which will move the door in the direction toward the open position) or a second signal (second direction, which will move the door in a direction toward the closed position). This specification describes the transmission and receipt of signals between various components and the controller 1000. Various paths for passing signals are depicted schematically as 201-206 in FIG. 1*a*, and the cabinet 10 will include the required wiring or other paths for signal flow between the various components and the controller 1000 as is well known in the art.

The motor 110 may be such that the motor 110 stops rotating automatically if the first or second signal is no longer received. In some embodiments, the motor shaft 112, includes first and second portions 113, 114 that extend from the motor housing in opposite directions with both portions 113, and 114 either being the same shaft or rotatably fixed with respect to each other such that both shaft portions 113, 114 always rotate in the same direction. In some embodiments, the portions 113, 114 may be separate shafts with a transmission therebetween to allow the different portions 113, 114 to rotate at different speeds. The embodiment disclosed in the figures depicts a single shaft 112 where the portions 113, 114 are opposite ends of the same shaft and where torque is applied to the shaft at an intermediate point between the two ends (within and enclosed by the motor housing). The motor shaft 112 position may be identified and controlled with one of various types of conventional technologies, such as an encoder, hall effect sensors, visual markings upon the motor shaft, or the like.

The inner plate 70 (best shown in FIG. 7) may be positioned in surface to surface contact with the side panel 56 of the door 50, while in other embodiments, the inner plate 70 may be positioned spaced from but maintained substantially parallel to the side panel 56 for all or for at least a portion of the inner plate 79. The term "substantially" is specifically defined to mean exactly the reference value as well as with an angle of no more than 5 degrees plus or minus the reference value. The inner plate 70 may include a collar 78 that is fixed to a center hole therethrough. The inner plate 70 is fixed to the first end portion 113 of the shaft 112, either with the collar 78 having a flat that mates with a corresponding flat 113*a* upon shaft 113 and/or with a set screw that extends through the collar 78 and engages the shaft 112.

The inner plate 70 includes a slot 72 that receives a first leg 58 that extends perpendicularly from the side panel 56. The slot 72 has an arc length that allows for a certain amount of relative rotation between the inner plate 70 (and the motor shaft 112 to which the inner plate 70 is fixed) and the side panel 56. In some embodiments, the slot 72 may be sized to allow for 12 degrees or about 12 degrees of relative rotation between positions where the first leg 58 contacts a first end 72*a* of the slot and when the first leg 58 contacts the second end 72*b* of the slot 72. In other embodiments, the slot 72 may have an arc length to allow other amounts of relative rotation, such as 10 degrees, 15 degrees, 20 degrees, or any amount within the range of about 10 degrees to about 20 degrees inclusive of all angles within this range.

A spring 79 is disposed between the side panel 56 and the inner plate 70, with the spring 79 provided to urge against relative rotation of the inner plate with respect to the side panel, such as to urge the first leg 58 to contact the first end 72*a* of the slot 72. In other embodiments, a torsion spring may be disposed about the motor shaft 112 and connect the motor shaft and the side panel 56 to urge the side panel to rotate with the motor shaft 112.

In a preferred embodiment, the inner plate 70 is disposed within the compartment 20 or at least on a side of the side panel 56 of the door 50 in the direction of the respective compartment 20.

The motor assembly 100 further includes a travel slot 82 that may be disposed upon the rigid plate 102, through which a second leg 62 extends. The second leg 62 is fixed to the side panel 56 and in some embodiments extends in an opposite direction therefrom as the first leg 58, and in some embodiments, the second leg 62 extends in a direction away from the respective compartment 20. The second leg 62 extends through the travel slot 82, with the arc length of the travel slot 82 establishing the amount of potential movement of the door 50 between the closed position and the open position, in other words the range of motion of the side panel 56 of the door 50 with respect to the rigid plate 102, which is fixed to the side wall 25 of the compartment 20.

In some embodiments, the travel slot 82 includes 90 degrees of arc length to allow the door 50 to move from the closed position to an open position is perpendicular to the closed position, with all, or in some embodiments, a significant portion of the door 50 positioned within the compartment 20 when in the open position. In some embodiments, the travel slot 82 may be exactly 90 degrees, or substantially 90 degrees, while in other embodiments, the travel slot 82 may be between about 80 and about 100 degrees including all values within that range, with the sizing of the door 50 and the opening 20*a* into the compartment 20 being such that the largest object that is envisioned to be received within the compartment can be put into and withdrawn from the compartment with the door 50 in the open position.

Figure 6:
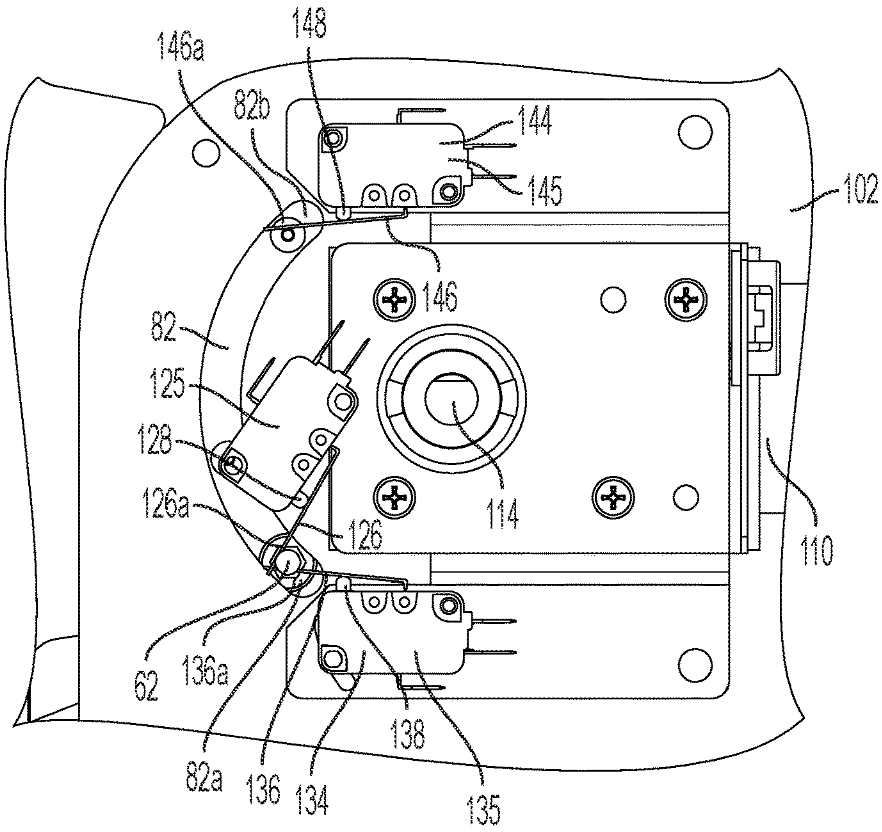
FIG. 6 is the view of FIG. 5 with a second plate of the motor assembly removed from the view.
Figure 10:
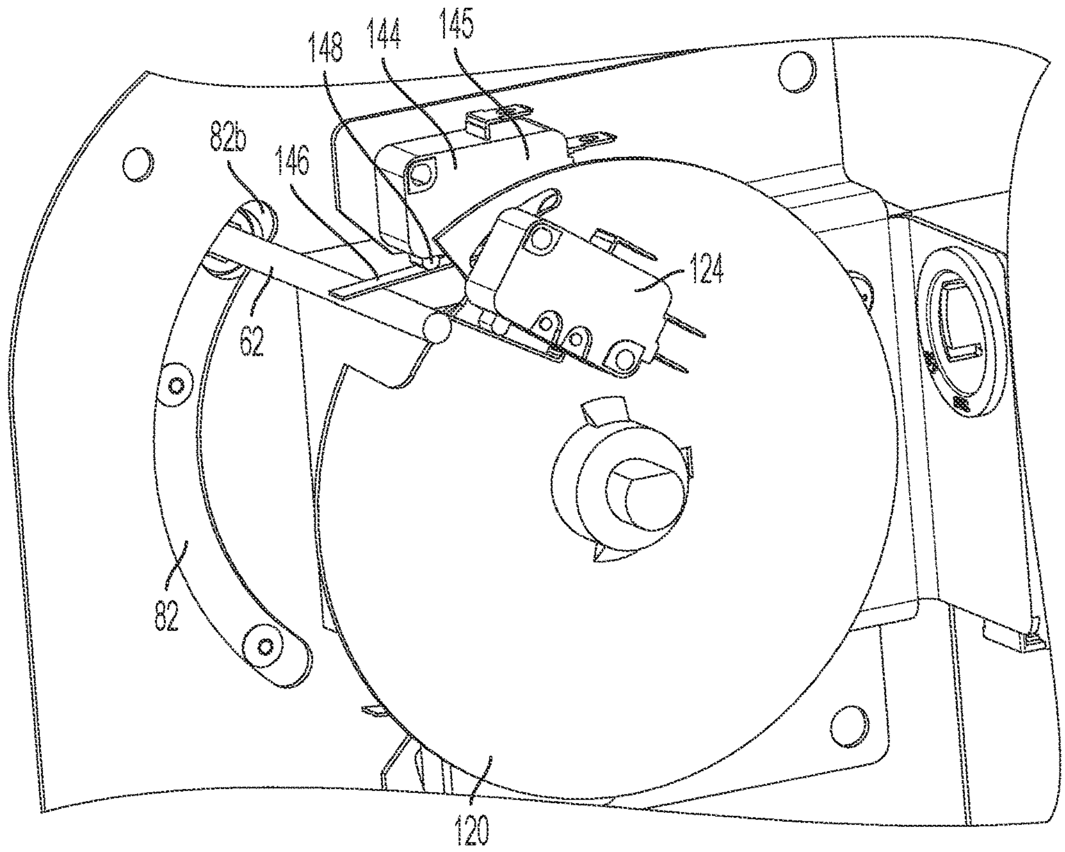
FIG. 10 is a detail view of detail C of FIG. 9.
Figure 10A:
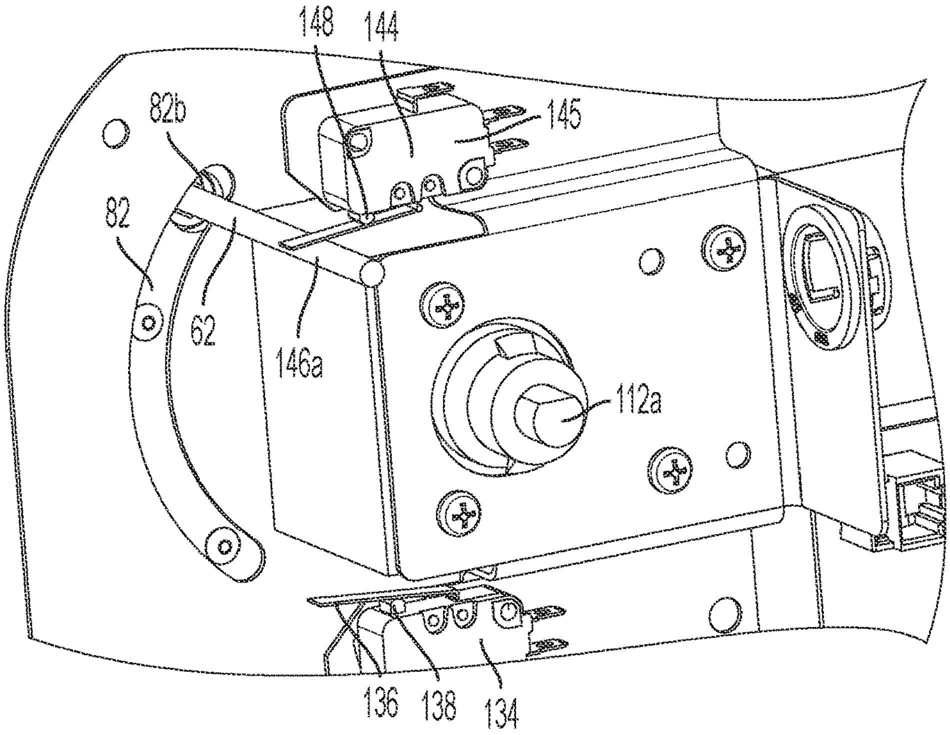
FIG. 10*a* is the view of FIG. 10 with the second plate of the motor assembly removed from view.
Figure 11:
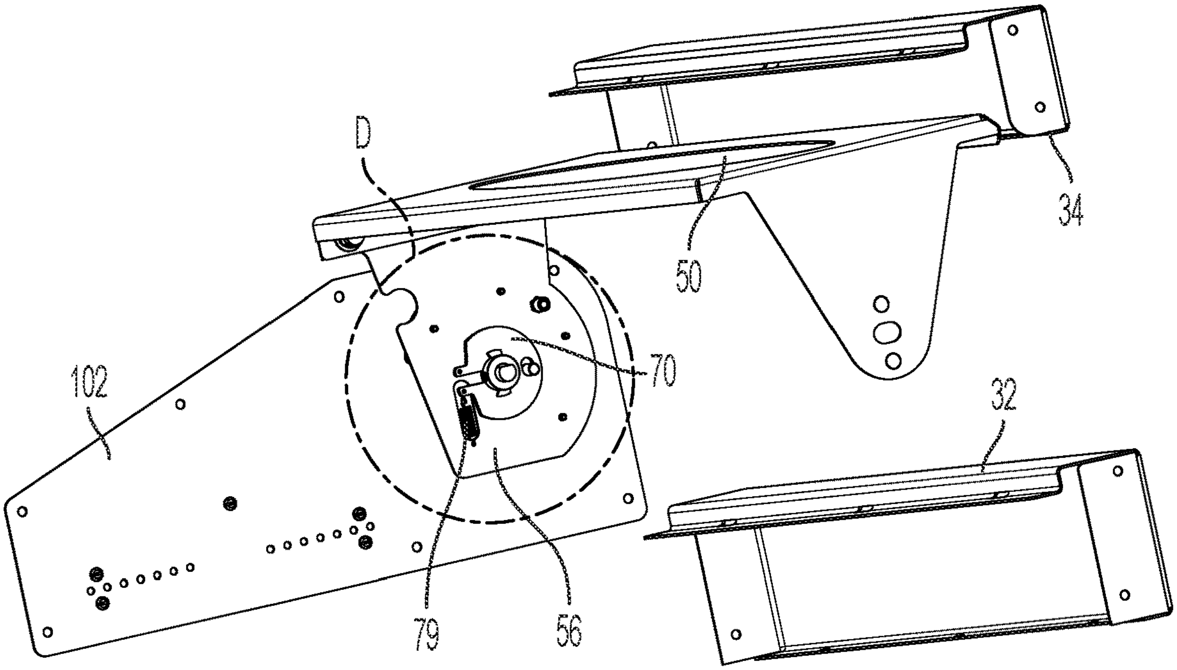
FIG. 11 is a view of an inner portion of the motor assembly, with the door in the open position.
Figure 11A:
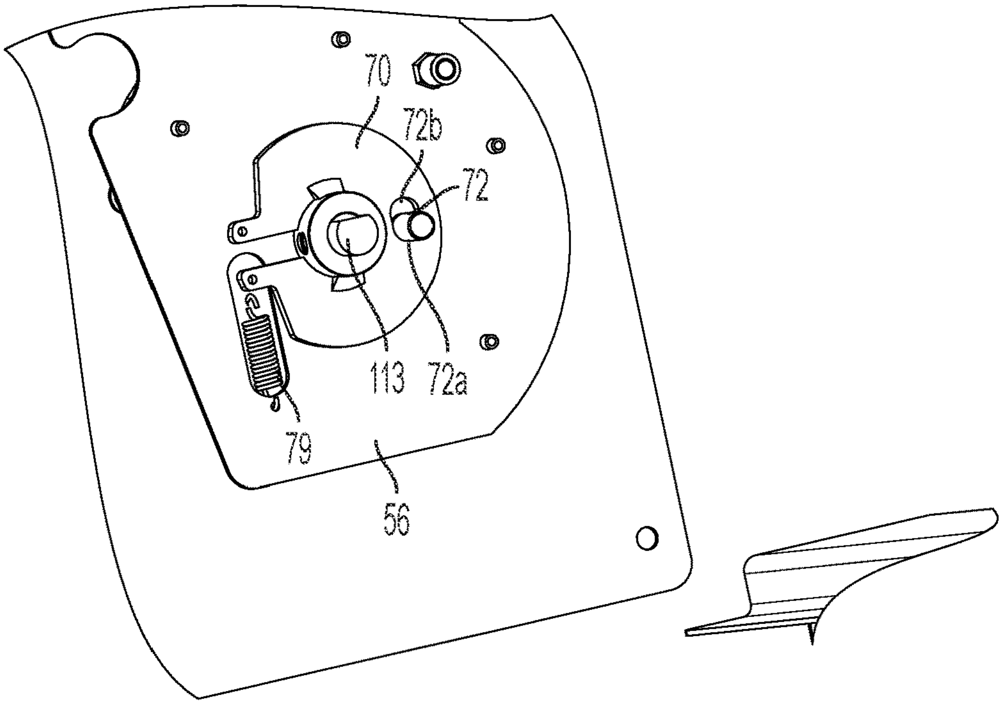
FIG. 11*a* is a detail view of detail D of FIG. 11.
Figure 12:
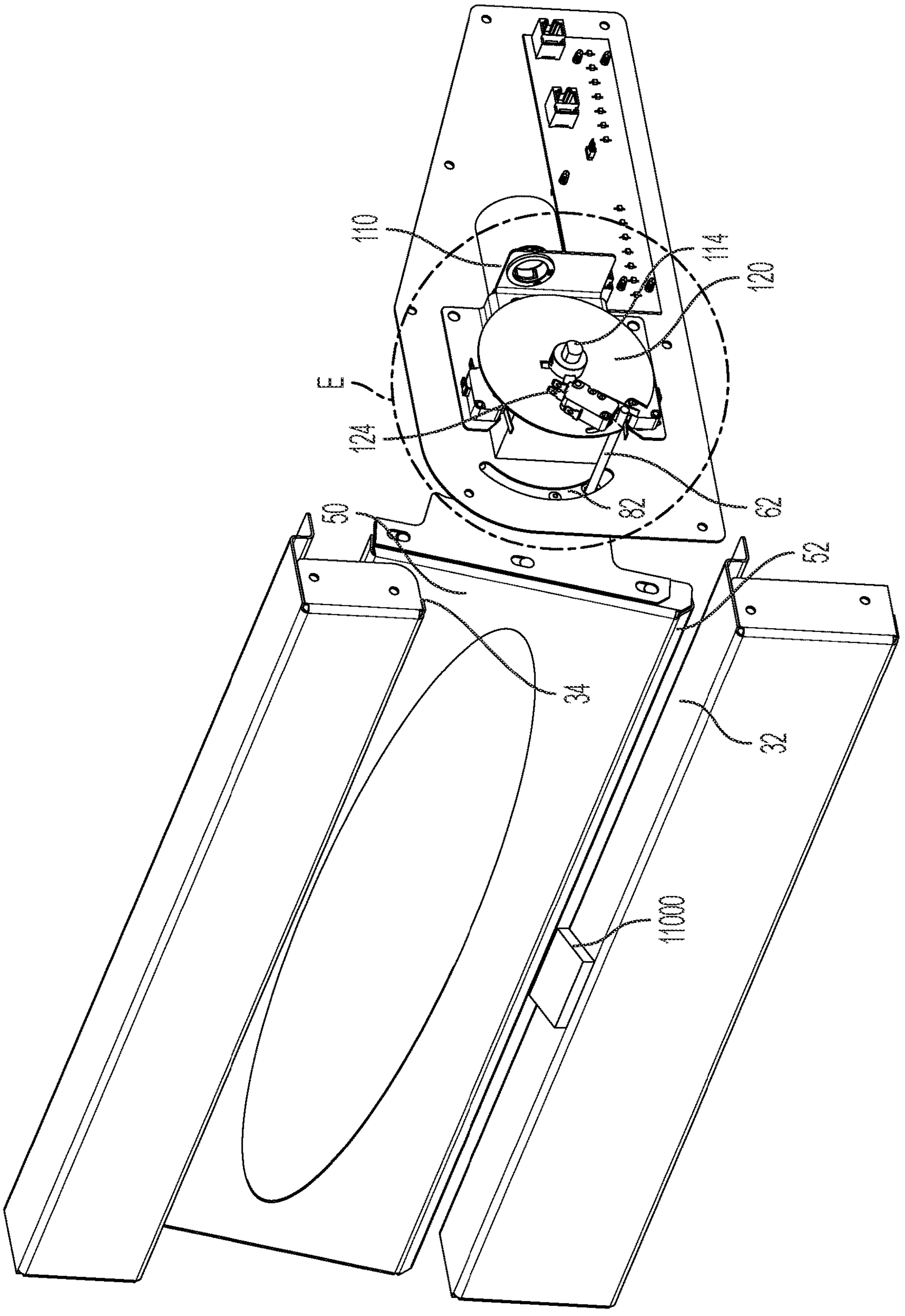
FIG. 12 is the view of FIG. 3 with the door in an intermediate position with an object disposed between the lower edge of the door and the housing.
Figure 13:
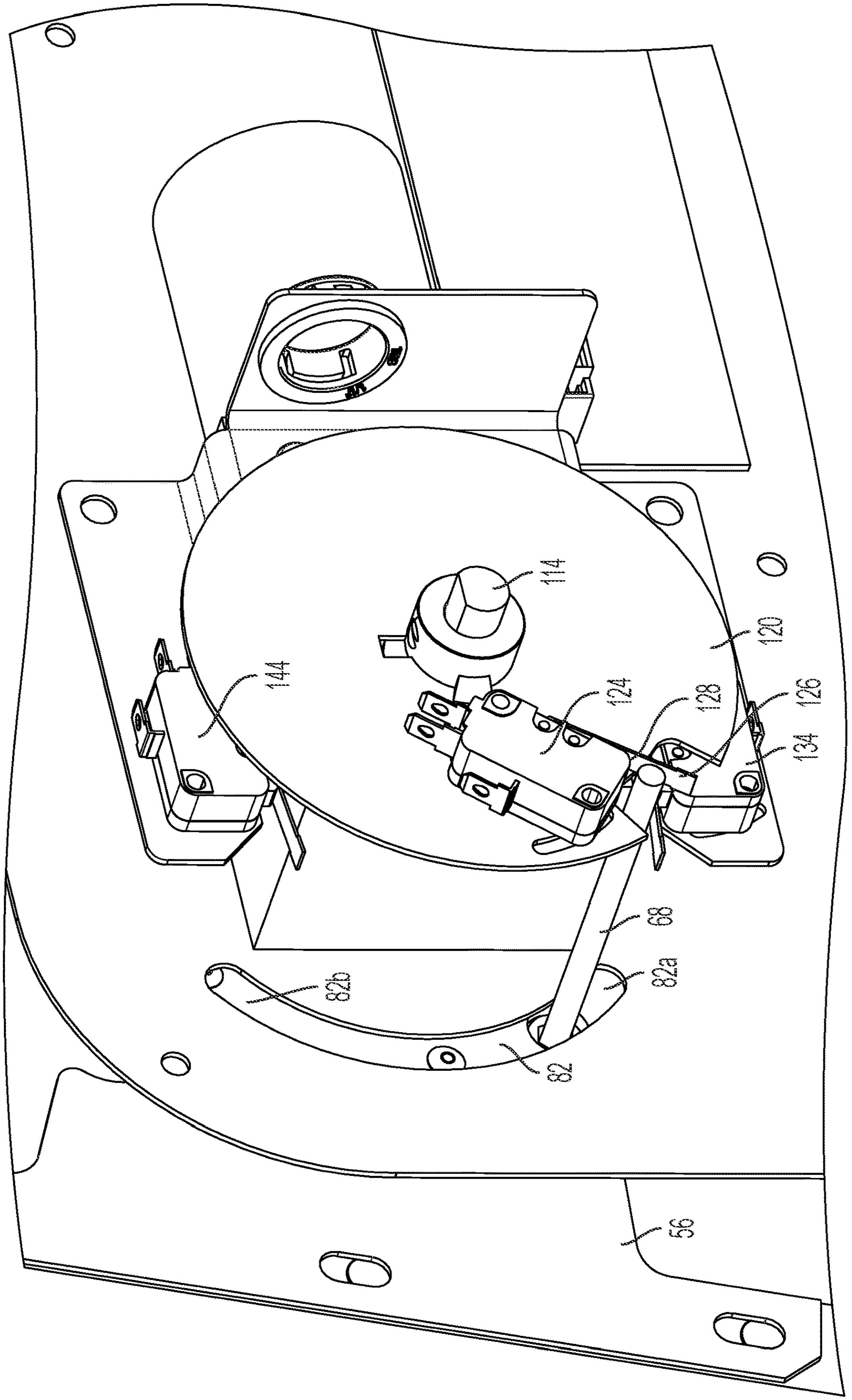
FIG. 13 is detail view of detail E of FIG. 12.
Figure 14:
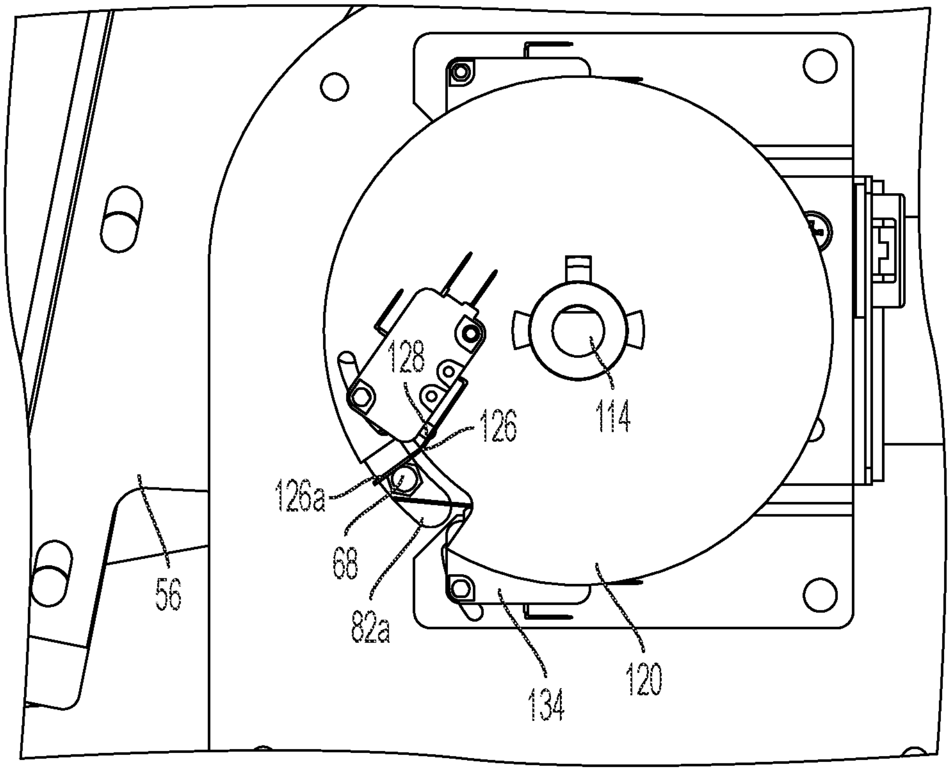
FIG. 14 is a side view of detail E of FIG. 12.
Figure 15:
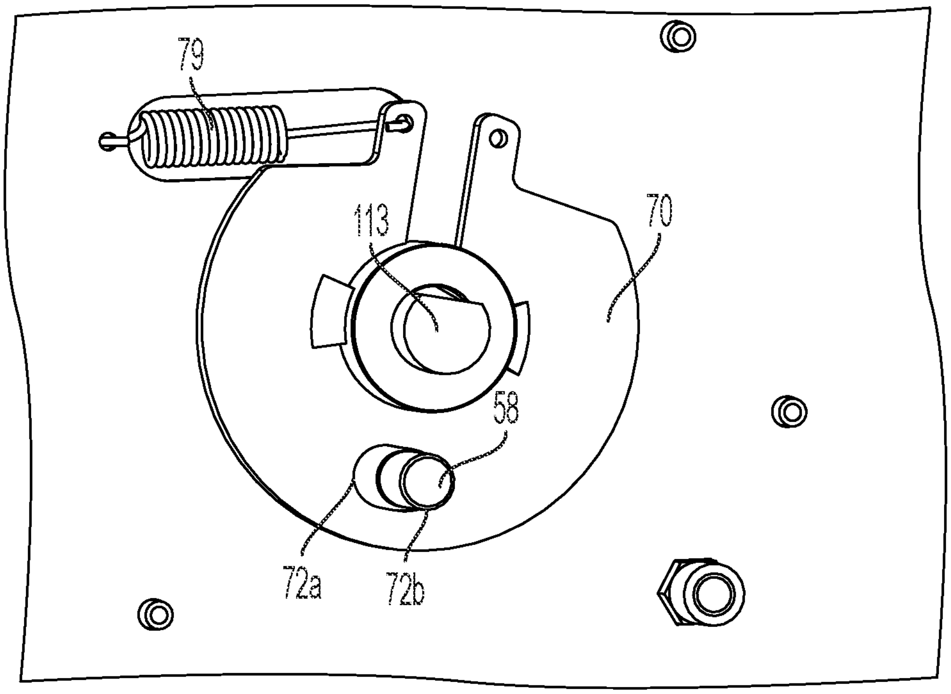
FIG. 15 is a view of an inner portion of the motor assembly, with the door in the intermediate position with an object disposed between the lower edge of the door and the housing.
Figure 16:
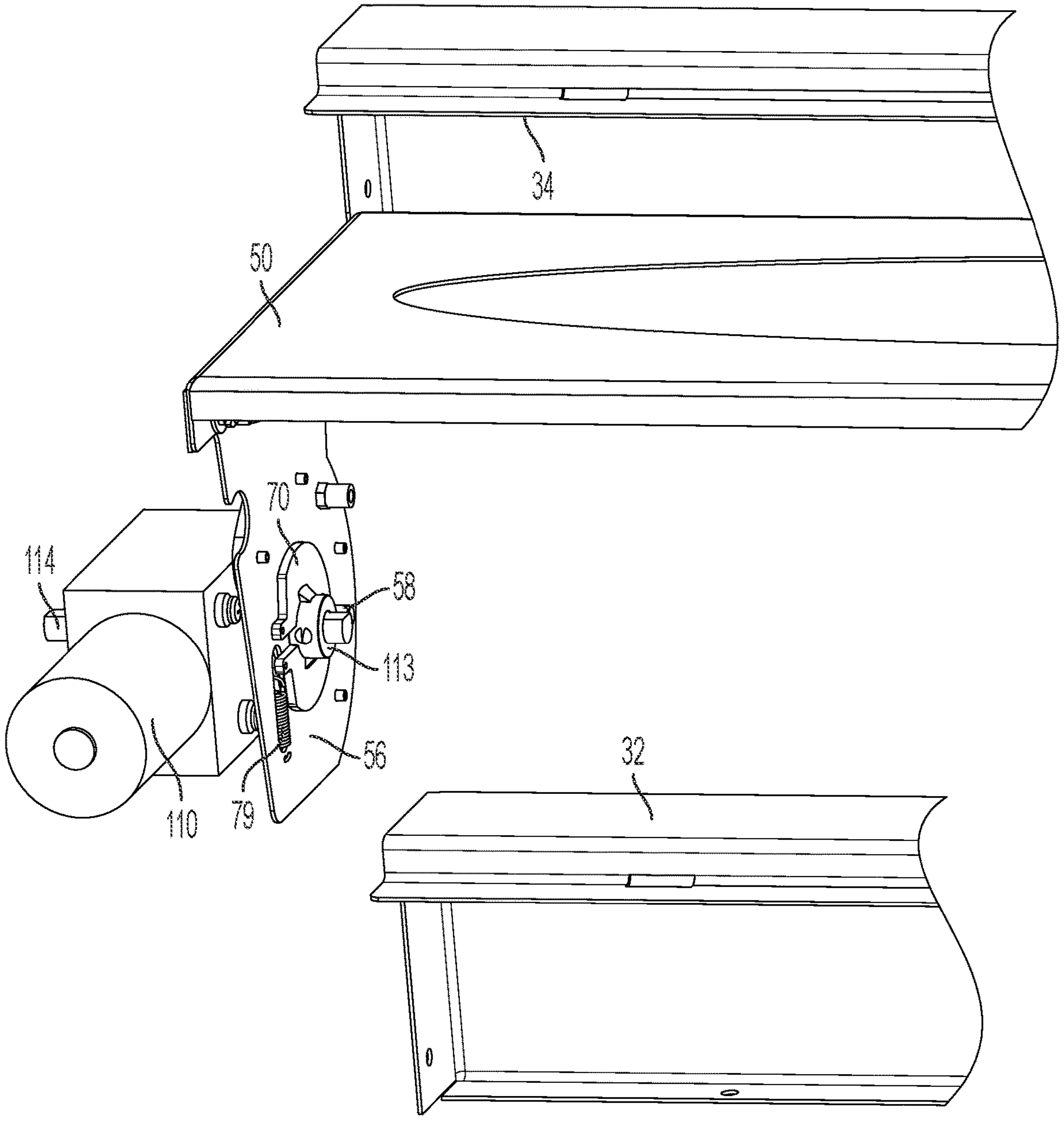
FIG. 16 is another perspective view of the motor assembly and the door with the door in the open position, with portions of the motor assembly removed.
Figure 17:
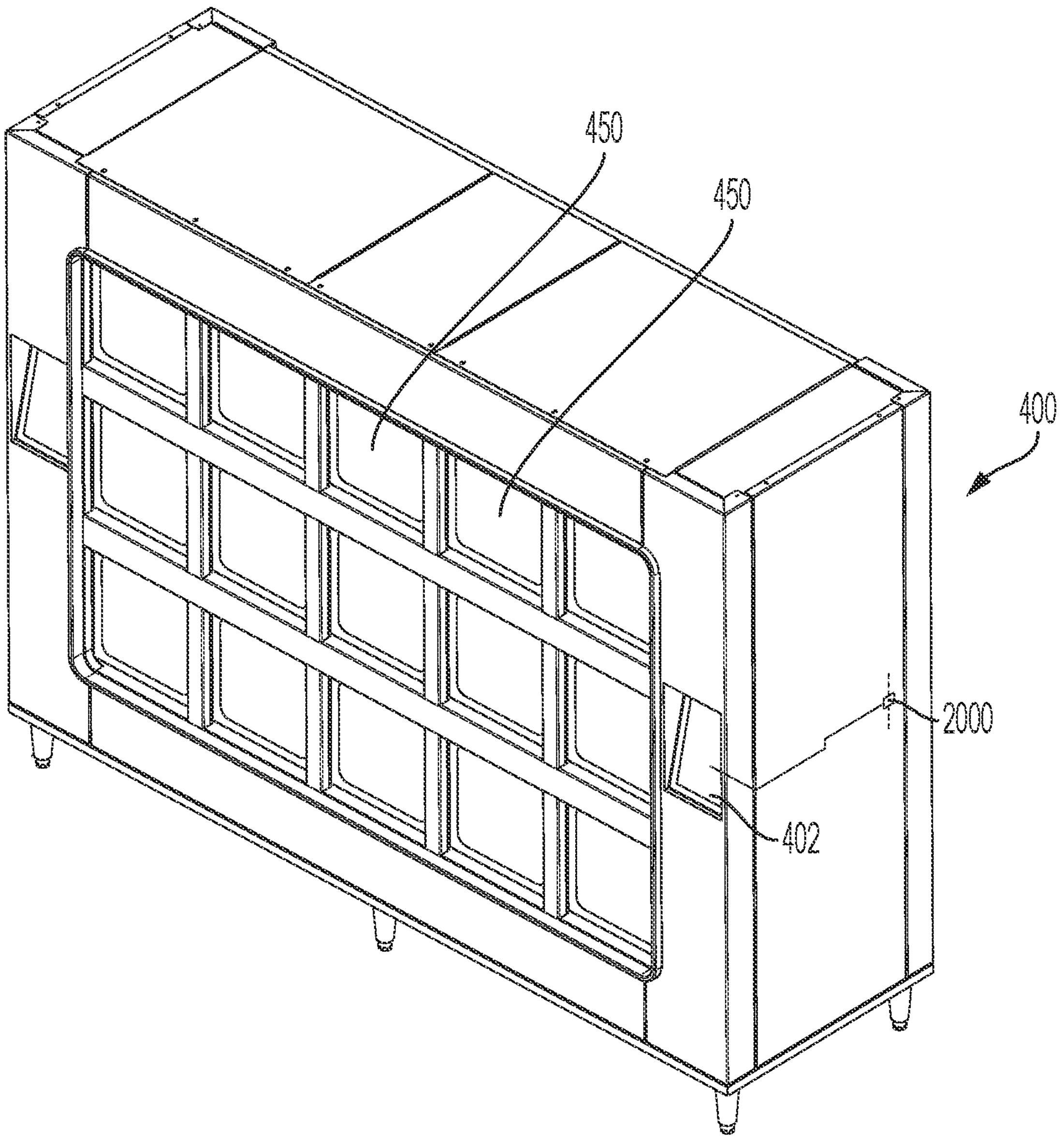
FIG. 17 is a perspective view of a cabinet with a plurality of compartments that can each be isolated by a door capable of automatic operation.

As best shown in FIGS. 6, 10, and 10*a*, the motor assembly 100 has first and second door position sensors 134, 144 that are fixed with respect to the side wall 25 of the compartment 20 and in some embodiments are fixed to the rigid plate 102. The first door position sensor 134 is configured to determine when the second leg 62 has reached, or is in close proximity to the first end 82*a* of the slot 82, which corresponds to the closed position of the door 50. Similarly, the second door position sensor 144 is configured to determine when the second leg 62 has reached or is in close proximity to second end 82*b* of the slot 82, which corresponds to the open position of the door 50.

One or both of the first and second door position sensors 134, 144 may have a tongue 136, 146 that extends in a cantilevered manner from the housing 135, 145 of the respective sensor and an input device 138 148 upon the housing 135, 145. In some embodiments, the input device

138, 148 may be a biased member that normally extends out of the sensor housing toward the tongue, and with motion of the tongue toward the housing is compressed into the housing against the biasing force. In one embodiment, the sensors may be a sensor such as the D3V Miniature Basic Switch, manufactured by Omron. In other embodiments, the input device 138, 148 may work based upon magnetic coupling when the tongue is moved close enough to the sensor, or with electrical coupling when the tongue makes contact with the input device, or by other methods of sensing a changing position of the tongue that are known in the art.

In these embodiments, the tongue 136, 146 of the respective first and second sensor is disposed such that it extends through the path of the second leg 62 as the second leg 62 slides through the slot 82 with door movement. As shown in FIGS. 10 and 10*a*, the tongue 146 of the second sensor 144 is disposed in a position where it is first contacted by the second leg 62 (at position 146*a* upon the tongue 146) as the second leg approaches the second end 82*b* of the slot, i.e. when the moving door 50 approaches the open position (FIG. 10*a*). Continued motion of the second leg 62 applies a force upon the tongue to bend the tongue toward the housing 145 and the input device 148. In embodiment where the input device is a biased member, continued motion of the second leg 62 causes the tongue 146 to contact and apply a force against the input device 148 thereby pushing the input device 148 into the housing 145 of the sensor as depicted in FIG. 10*a*. With sufficient motion of the input device 148 an electrical connection within the sensor housing 145 is either made or lost (depending upon the design of the sensor as normally open or normally closed), which either establishes or stops a signal that is sent to the controller 1000 (depending upon the electrical design of the motor assembly 100) that identifies to the controller that the door 50 has reached the open position 50 (and in some embodiments the signal (or lack or signal) continues as the door remains in the open position). As discussed herein (and with respect to this second sensor, as well as the first sensor 134 and the safety sensor 124, discussed below), the change in the signal sent to the controller (i.e. either specifically sending a signal to the controller at the time the input device 148 makes or breaks the electrical connection or stopping sending a previous signal to the controller) is defined as sending a signal to the controller (i.e. the signal to the controller is either starting to send the signal or discontinuing to send a previous signal). When the controller 1000 receives the signal (or as mentioned above, identifies that the previous signal was lost) the controller 1000 discontinues sending the first signal to the motor, which stops the motor shaft 112 from spinning in the open direction.

In some embodiments, the second position sensor 144 and its tongue 146 are positioned such that the second leg 62 contacts the tongue (at position 146*a*) and moves the tongue 146 to actuate the input device 148 at a position before the second leg 62 reaches the end 82*b* of the slot, such that time is allotted for the controller to stop actuating motion of the motor shaft before the second leg 62 contacts the end 82*b* of the slot to prevent the second leg 62 from contacting the end 82*b* with significant momentum (speed) to prevent banging or vibration, and to minimize any noise created as the door movement stops due to the second leg 62 reaching the mechanical stop 82*b* of the end of the slot 82.

In other embodiments, the second position sensor 144 may be a proximity sensor, or a light sensor, or a position sensor, or a magnetic sensor. For example, the second position sensor may include an arm that is positioned to extend into the path of the second leg, which when contacted by the arm directly makes an electrical connection that results in a signal being sent to the controller. Alternatively, the sensor may be a magnetic sensor that couples with the second leg 62 when in close proximity to the second leg, with the magnetic coupling resulting in a signal being sent to the controller. Still alternatively, the sensor may be a light sensor that sends a light beam across the path of the slot 82, which identifies that the second leg 82 is at or proximate to the second end 82*a* of the slot when the second leg breaks the light beam, resulting in a signal being sent to the controller. Other types of sensors that can detect the position of the second leg 62 within a certain position within the slot 82 may be provided to replace the second sensor 144 specifically described above (as well as the first and safety sensor discussed below) and one of ordinary skill in the art after a thorough review of this specification will readily be able to use alternate sensors that are known in the art without undue experimentation.

The operation of the first position sensor 134 operates in a similar manner to the second position sensor 144 discussed above. The tongue 136 of the first position sensor 134 is disposed through the slot 82 and in a position where it is contacted by the second leg 62 (at position 136*a*) as the second leg approaches the first end 82*a* of the slot, i.e. when the door 50 is being moved from the open position toward the closed position. As with the second sensor 144 discussed above, when the second leg 62 contacts the tongue 136 of the first sensor 134, it applies a force to the tongue 136, which bends the tongue 136 toward the housing 135 until it contacts the input device 138, and with continued motion of the second leg 62 the input device 138 is pushed into the housing 135 a sufficient amount to make or lose an electrical connection within the housing, which establishes or stops a signal to the controller 1000, in a similar manner to the signal being sent or stopped to the controller from the second position sensor 144 discussed above. FIG. 6 depicts the tongue 136 pushing the input device 138 into the housing (and the initial position, with contact between the second leg 62 and the tongue but without yet contacting the input device would be similar to FIG. 10).

Embodiments where the input device 138, 148 is not a mechanically movable input device, but instead worked with magnetic coupling or with an electrical signal made directly between the tongue and the input device (when engaged) would operate in a similar manner with respect to the second leg 62 causing motion of the respective tongue when the door reached the established position.

The motor assembly 100 further comprises a safety sensor 124. In some embodiments, the safety sensor 124 is the same type of sensor as used for the first and second sensors 134, 144, or the safety sensor may be a different type of sensor. The safety sensor 124 is configured to move along an arc with rotation of the motor shaft 112. In some embodiments an outer plate 120 is fixed to the motor shaft 112, and in some embodiments the first end 114 of the motor shaft 112. The outer plate 120 may include a collar 122 which fixes to the motor shaft in a similar manner to the structure to fix the inner plate 70 to the motor shaft as discussed above. The safety sensor 124 is fixed proximate to the outer circumference of the outer plate 120 and aligned such that its tongue 126 extends across the second shaft 62 and in some embodiments makes contact with the second shaft 62, with the tongue 124 making contact with a portion of the second shaft 62 that generally faces the second end 82*b* of the slot 82. As discussed further below, in circumstances when there is relative motion between the motor shaft 112 and the door 50 (e.g. the motor shaft 112 rotates in the direction to close the door 50 but the door does not move in this direction), the outer plate 120 rotates and the safety sensor moves in an arc with the circumference of the outer plate 120, but the second leg 62 stops moving (or doesn't move as fast as the safety sensor). This relative motion causes a force to be applied to the tongue 126, which eventually causes the tongue 126 to contact and move the input device 128. With sufficient motion of the input device 128 into the housing 125, and electrical connection is either made or lost, which causes a signal from the safety sensor to the controller 1000 to be made or lost, which causes the controller 1000 to stop sending a signal to rotate the motor shaft 112 in the closing direction.

Figure 7:
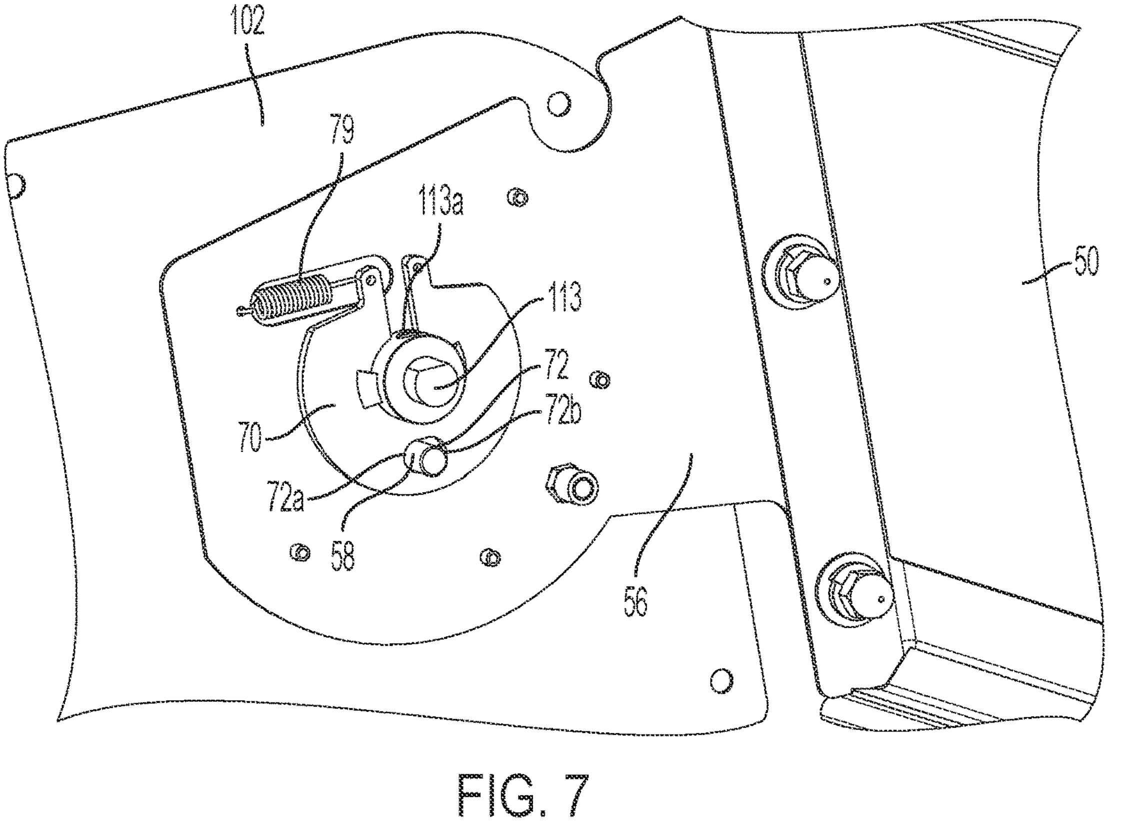
FIG. 7 is a view of an inner portion of the motor assembly, with the door in the closed position.

The safety sensor 124 works in conjunction with the inner plate 70, and specifically the slot 72 within the inner plate 70 that receives the first leg 58. Normally, when the motor shaft 112 rotates, the first leg 58 (that extends from the side panel 56 of the door 50) contacts the first end 72*a* of the slot 72 as the motor shaft 112 rotates in a direction to transfer the door from the open position toward the closed position (FIG. 7). If the motion of the door 50 is blocked, as shown schematically by an object 11000 disposed between the upper surface 32 of the cabinet and the bottom edge portion 52 of the door in FIG. 12, the door 50 and therefore the side panel and the first and second legs 58, 62 are prevented from motion in the closing direction, and as the inner plate 70 continues to rotate with the motor shaft 112, causing the first shaft to move along the slot 72 until it reaches the opposite end 72*b* of the slot 72 (FIG. 15) with the force to continue to rotate the inner plate against the biasing force of the spring 79.

At the same time, with rotation of the motor shaft 122, the outer plate 120 also continues to rotate, which causes the safety sensor 124 to continue moving within an arc, but the second leg 62 discontinues rotating due to the object 11000 preventing motion of the door. As the safety sensor 124 continues to rotate, a force is applied to the tongue 126, which bends the tongue into contact with the input device 128 (or with other types of sensors, coupling with the input device), which causes the input device to move into the housing 125 and make or break an electrical connection as discussed above, which ultimately causes the controller 1000 to stop rotation of the motor shaft 112.

In a preferred embodiment, the amount of rotation of the motor shaft when the door is prevented from moving is preferably sufficient to cause the safety sensor 124 to send a signal to the controller 1000 to stop rotating the motor shaft before the first leg reaches the second end 72*a* of the first slot 72.

In some embodiments, when the first sensor 134 sends a signal to the controller that is indicative that the door is close to or has reached the closed position, the controller 1000 upon receiving that signal is able to send a signal to the motor to rotate the shaft in the direction to cause the door 50 to move toward the open position (such as upon receipt of an input from a user that the user desires to retrieve the items within the respective compartment 20), but is unable to send a signal to the motor to cause the shaft to rotate in the direction to cause the door to continue moving toward closed position. Similarly, when the second sensor 144 sends a signal to the controller that is indicative that the door is close to or has reached the open position, the controller 1000 upon receiving that signal is able to send a signal to the motor to rotate the shaft in the direction to cause the door 50 to move toward the closed position (such as after a delay time after the sensors 40 determine that the items within the compartment 20 have been removed), but is unable to send a signal to the motor to cause the shaft to rotate in the direction to cause the door to continue moving toward the open position.

One of ordinary skill in the art with a thorough review of this specification will understand that the motor assembly 100 and specifically the features to discontinue rotation of the motor shaft 112 when there is a blockage of the movement of the door is configured to minimize any potential injury if a user's hand or arm or other extremity is disposed between the door 50 and the top surface 32 of the cabinet, as well as to minimize damage to objects if a physical object is disposed below the door to prevent motion of the door. One of ordinary skill will be able to size and appropriately position the components described herein to best satisfy these purposes of the system for varying sized compartments, doors, and the like with only routine optimization.

In some embodiments, when the controller 1000 receives (or loses) the signal from the safety sensor 124, the controller 1000 may be programmed to immediately send a signal to the motor 110 to rotate the motor shaft 112 in the opposite direction, i.e. to transfer the door toward the open position.

Turning now to FIGS. 17-21*b*, another representative embodiment of the disclosure is provided. The embodiment relates to an alternate cabinet 400 with a plurality of compartments 420 each with their own door 450. The cabinet 400 is configured to automatically open the door 450 associated with one of the compartments upon receipt of a signal from a remote device or from an input device 402 associated with the cabinet 400. The signal from a remote device may be a signal generated by a customer's app, a delivery service's app, a restaurant's app, etc. upon a phone, tablet, computer, or another device capable of generating and communicating a signal. For example, the cabinet 400 may include Wi-Fi, cellular, Bluetooth, or other data communications technologies that work wirelessly with a remote server or network, or hard wired connectivity to a server that receives a signal from a remote device associated with the customer.

The cabinet 400 includes a plurality of compartments 420 which are individually enclosed by individual doors 450. In some embodiments, the construction of the cabinet 400 allows for the only access to the compartment 420 via an opening 420*a* that is selectively opened or enclosed by the door 450, while in other embodiments, the cabinet may include an opening, such as a back of a cabinet that is open. In this embodiment, the cabinet 400 may be designed to be disposed within a restaurant where a restaurant employee can access the opening to position items within a respective compartment (such as from a location within the restaurant where customers are not normally allowed or present), while customers can only access the compartments when the doors 450 are open. In some embodiments, the compartments 420 may be vertically stacked, such that a ceiling of a compartment forms a floor of the compartment positioned above that compartment. The cabinet may have a single or multiple columns of stacked compartments 420.

Figure 18:
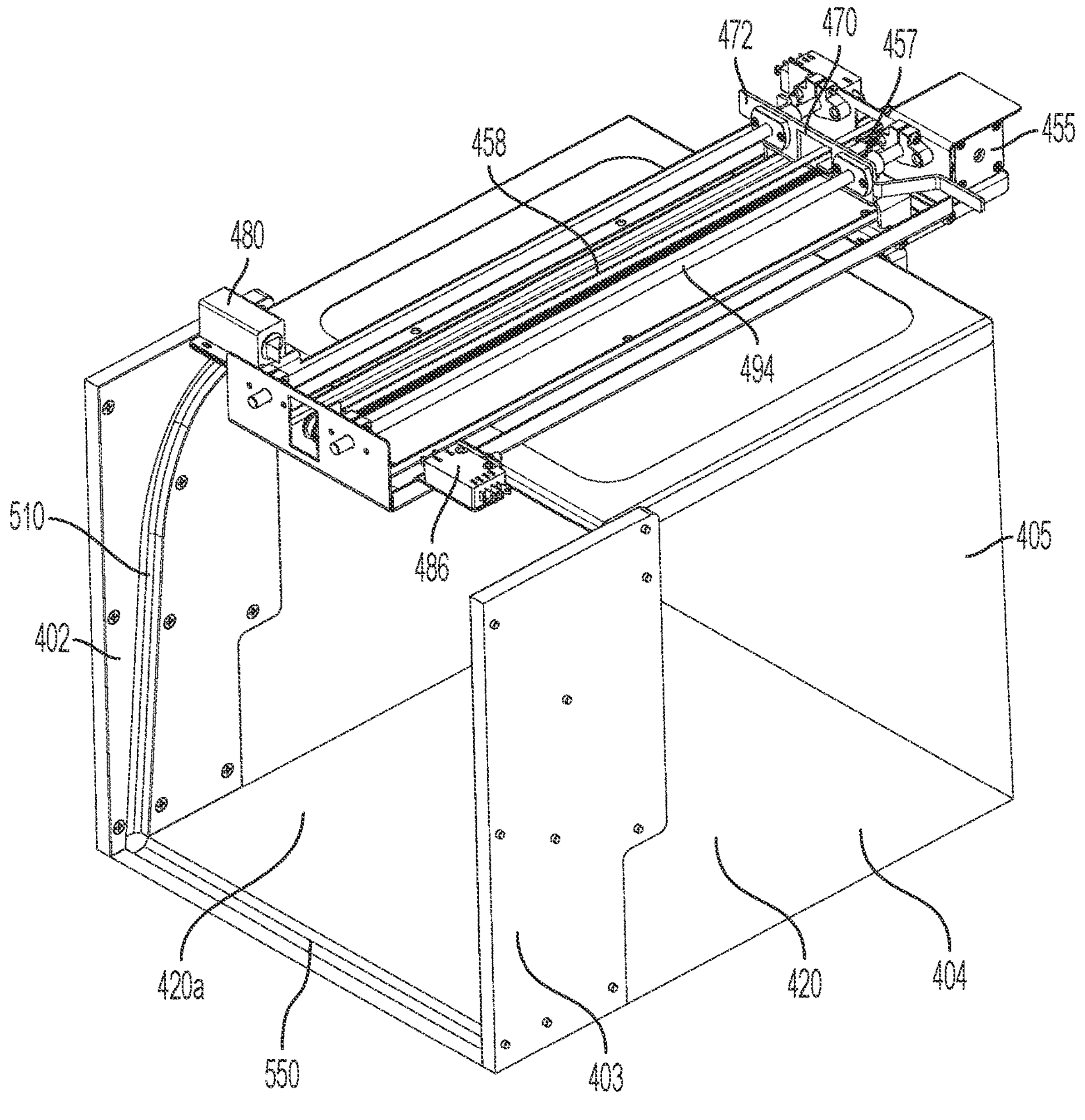
FIG. 18 is a perspective view of a portion of a compartment of the cabinet of FIG. 17 with the door in an open position.
Figure 18A:
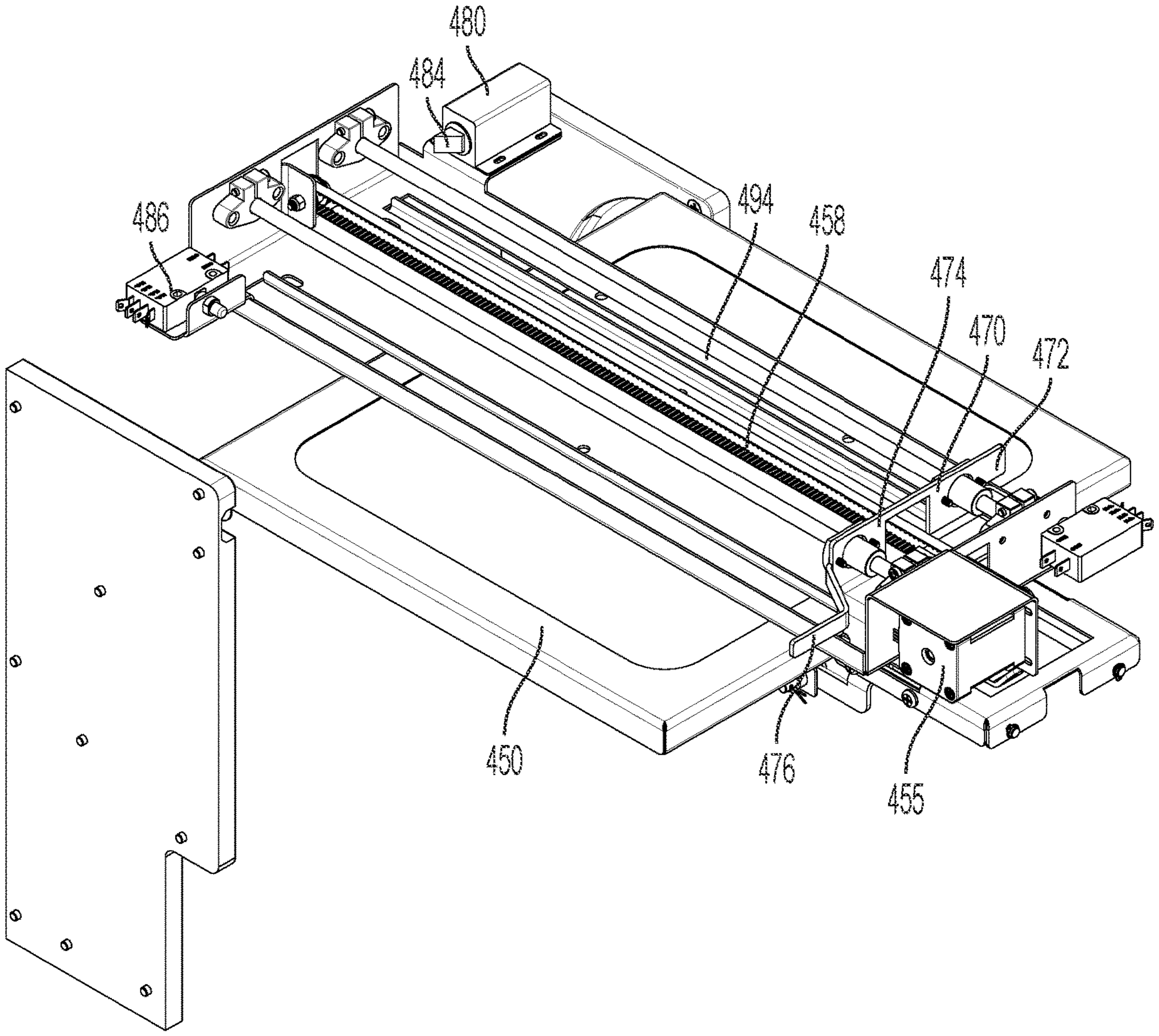
FIG. 18*a* is another perspective view of the view of FIG. 18.

The cabinet 400 has a system to identify when an obstruction is present below a door 450 and prevent further motion of the door 450 in the closing direction. The door 450 may move between a fully closed position (FIGS. 19-19*c*) to a fully open position (FIGS. 18-18*a*). The door 450 moves along a track 510 that is positioned along one or both right and left side walls 402, 403 of the compartment 420, with the walls (and floor 404 and ceiling (which may be formed by a floor in a compartment above the specific compartment, and rear wall 405, when provided) being a part of the housing within the cabinet.

The system includes a motor 455 that includes a motor shaft 456, which is engaged with a transmission 457 to allow for rotation of the motor shaft 456 to result in translation of the door between fully open and fully closed positions. In some embodiments, a belt 458 extends about the motor shaft 456 (or a pulley that is fixed to the motor shaft 456) such that rotation of the motor shaft 456 causes movement of the belt 458. The belt 458 may extend from the motor shaft to a second idler pinion (not specifically shown, but positioned at the belt proximate to the front end of the housing) that is positioned proximate opposite to the motor, such as in the depicted embodiment proximate to the opening 420*a* of the compartment with the motor positioned proximate to the rear of the compartment. In some embodiments, the belt may extend between the two pinions (or one pinion and the motor shaft 456), while in other embodiments the belt 458 may further extend around additional idler pinions, such as to allow for belt tension adjustment to simplify replacement of belts.

Figure 19:
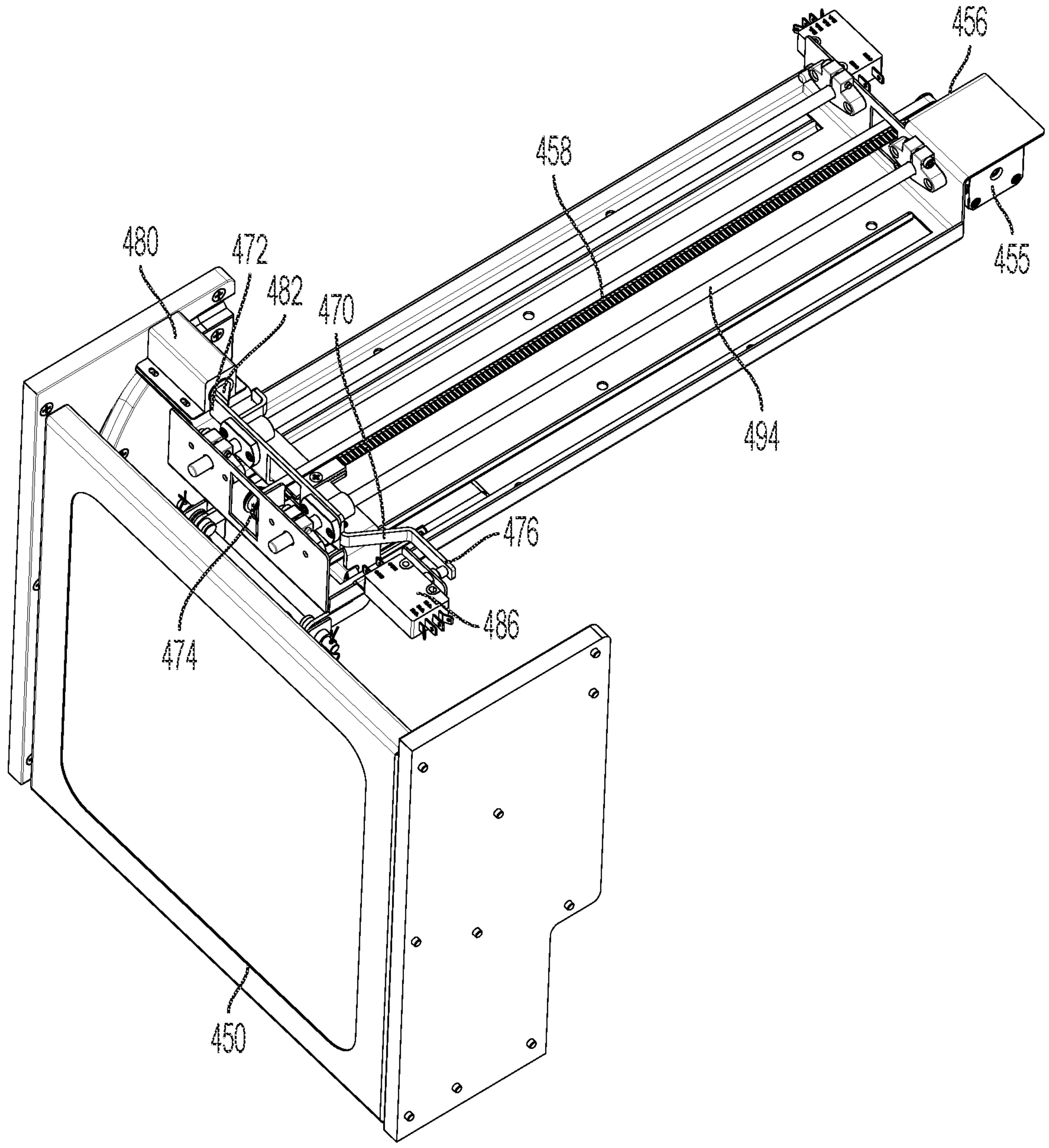
FIG. 19 is a perspective view of a portion of the compartment of FIG. 18 with the door in a fully closed position.
Figure 19A:
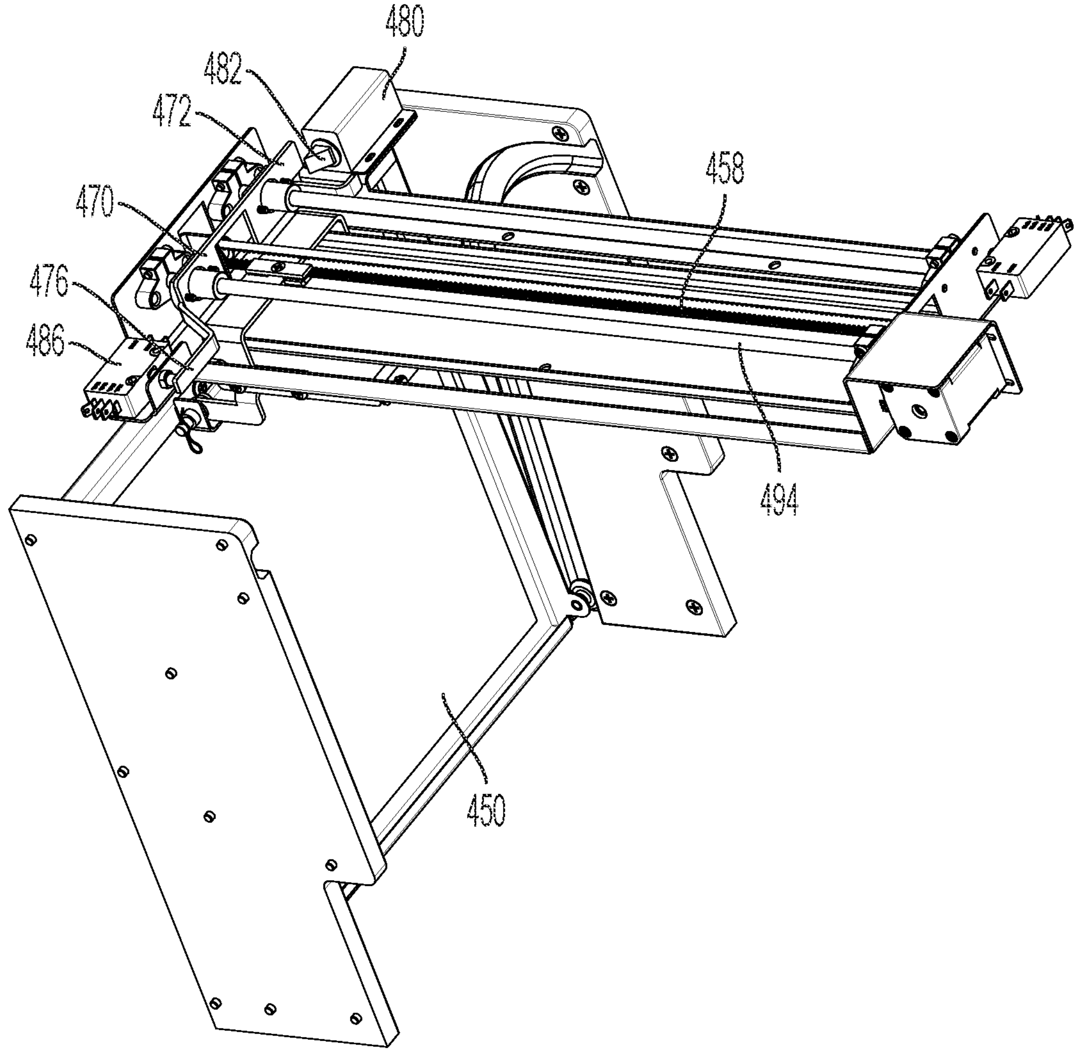
FIG. 19*a* is another perspective view of the view of FIG. 19 with the door in the fully closed position.

The system includes a carrier 470 that is fixed to the belt 458, such that the carrier 470 translates with movement of the belt. In some embodiments, the belt 458 has a plurality of teeth 458*a* disposed along the belt, and the carrier engages with the teeth 458*a* to prevent relative motion therebetween. As depicted in FIG. 19*c*, the carrier 470 may receive a fixture 499 that engages the teeth 458*a* of the belt to fix the carrier to the belt 458. The fixture 499 when provided has complementary teeth 499*a* to the teeth 458*a* of the belt 458.

The carrier 470 may ride along shafts 494 that extend along the compartment, which are positioned to support the travel of the carrier 470 between positions where the door is in the fully open position and the fully shut position.

The carrier 470 may have a planar portion 472 that includes apertures 473 to receive the shafts 495 therethrough. The planar portion 474 may support a finger 472 that extends therefrom (or is a part of the planar portion), which interacts with the projection 482, as discussed below. The planar portion 474 may additionally support an arm 476 that extends therefrom, which is aligned to interact with a position sensor 486 that is positioned proximate to the front of the compartment, which is discussed below. The arm 476 may extend along a plane that is parallel to a plane through the planar portion 474, to allow for positioning the position sensor 486 for detecting when the carrier 470 is in a fully forward position, but to provide space (X, FIG. 19*c*) for the position sensor to be positioned rearwardly of the front surface of the housing.

The position sensor 486 is provided to be engaged with by the carrier, and specifically the arm 476, when the carrier is in the fully forward position. The position sensor may have a plunger 486*a* that extends therefrom, which is pressed inwardly by the arm 476 when the carrier is in the fully forward position. Alternatively, the position sensor 486 may be a magnetic switch, an electric switch, or another known type of switch for determining a position of a movable member. The position sensor 486 generates a signal that the carrier 470 is in the fully forward position, which is used to stop rotation of the motor shaft 456 to discontinue movement of the carrier 470. The position sensor 486 may communicate directly with the motor, or a controller 2000 (depicted schematically in FIG. 17) may be provided to communicate between with the motor based upon receipt of a signal from the position sensor 486.

A lock 480 may be provided to prevent the carrier 470 (and therefore the door) from moving from a fully forward position (corresponding to the door being in the closed position) toward a rear position (corresponding to the door opening and moving to a fully open position). In one embodiment, the lock 480 includes a projection 482 that extends between a retracted position to allow free motion of the carrier 470 in the rear direction and an extended position that blocks the path of the finger 472 that extends from the carrier 470 (as best understood with reference to FIG. 19*c*).

The projection 482 may include a wedge shaped surface 484 that faces the finger 472 when the finger 472 is positioned rearwardly of the projection 482. The wedge shaped surface 484 is disposed such that when the finger 472 contacts the projection when moving in the forward direction, the finger emparts a forward directing force upon the wedge shaped surface 484, which due to the geometry of that surface provides a force vector that is perpendicular to the direction of travel of the finger 472, which causes the projection 482 to move linearly in a direction that is perpendicular to the direction of travel of the finger and withdraw from contact from the finger 472. The wedge surface 484 may be planar, or may be entirely or have a portion that is arcuate to constrain the movement of the projection as desired with forward motion of the finger 472.

With continued motion of the carrier 470 in the forward direction, the finger 472 causes the projection 482 to fully withdraw so that the finger can pass by the projection to allow the carrier 470 to reach the fully forward position. Once the finger 472 passes by the projection 482, the projection 482 returns to its normal position (FIG. 19*c*) automatically. In some embodiments, the projection 482 may be biased toward the normal position with a spring, or the projection may be biased or urged to the normal position with a magnetic force, or via a linear actuator, or based upon other known components to continuously urge a member in a direction for a given distance (but be capable to allowing opposing motion due to a force applied thereon in the opposing direction).

The projection 482 when in the normal position (positioned within the path that the finger 472 takes as the carrier 470 moves between the forward and rear positions) and the finger 472 is forward of the projection 482, the projection when in the normal position blocks rearward motion of the finger 472 (and therefore the carrier 470) in the rearward direction. This serves to "lock" the carrier 470 (and therefore the door 450, as discussed below) in the closed position. The projection 482, and an operator 481 which controls the position of the projection 482, receives a signal regarding the desired position of the projection (as mentioned above), i.e. in the locked position (projection 482 disposed within the path of finger motion) or unlocked position (projection 482 withdrawn away from the path of finger motion) and the operator 481 controls the position of the projection 482 based upon receipt of this signal. In some embodiments where a controller 2000 is provided, the controller 2000 receives the desired position signal of the door—(i.e. signal to maintain the door 450 locked in the closed position, or signal to open the door 450) and sends a signal to the operator 481 to either maintain the door in the closed position—i.e. maintain the projection 482 in the extended position (within the travel of the finger 472) or to open the door, which causes the operator 481 to withdraw the projection 482 from the extended position to allow rearward travel of the finger 472 past the projection. When the controller 2000 receives a command to open the door, the controller 2000 also sends a signal to the motor 455 to cause the motor to rotate its shaft 456 in the direction to cause the belt 458 to move in the direction to move the carrier 470 from the forward position toward the rear position.

Figure 19B:
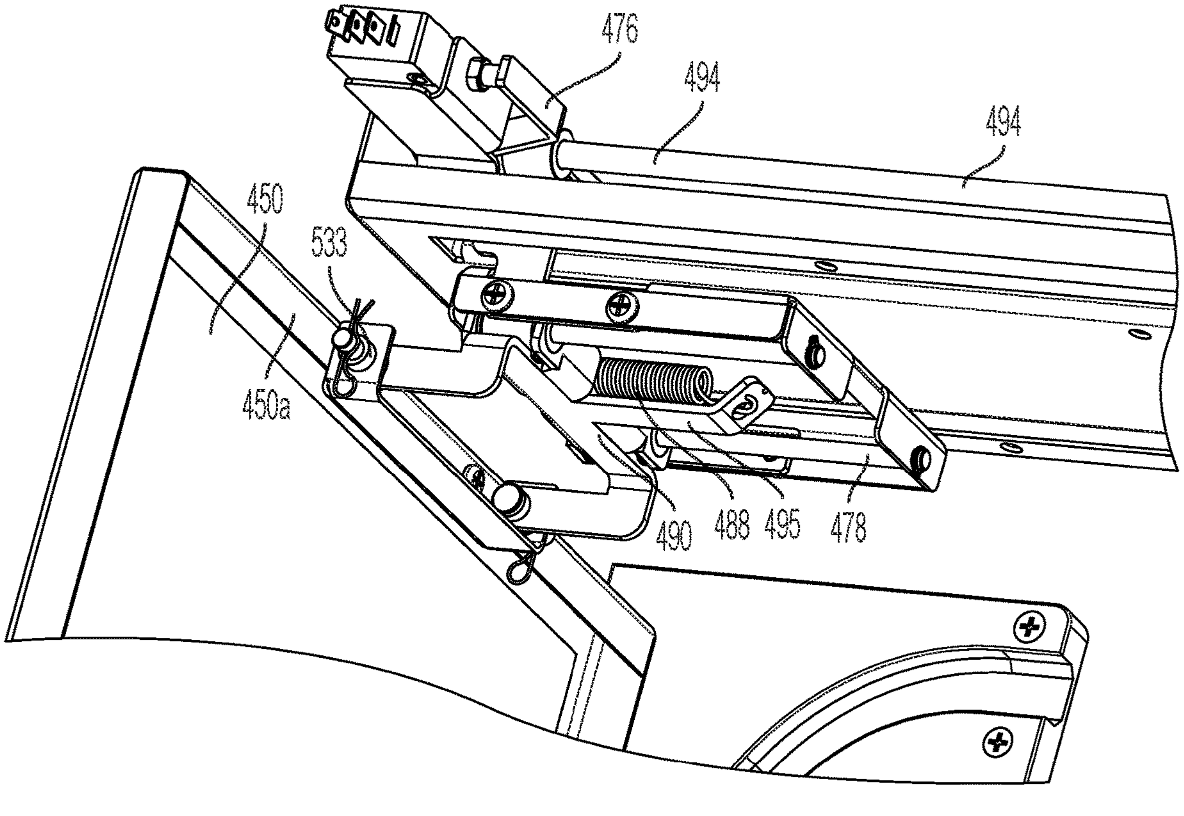
FIG. 19*b* is a detail perspective view of the compartment of FIG. 18 with the door in the fully closed position.
Figure 19C:
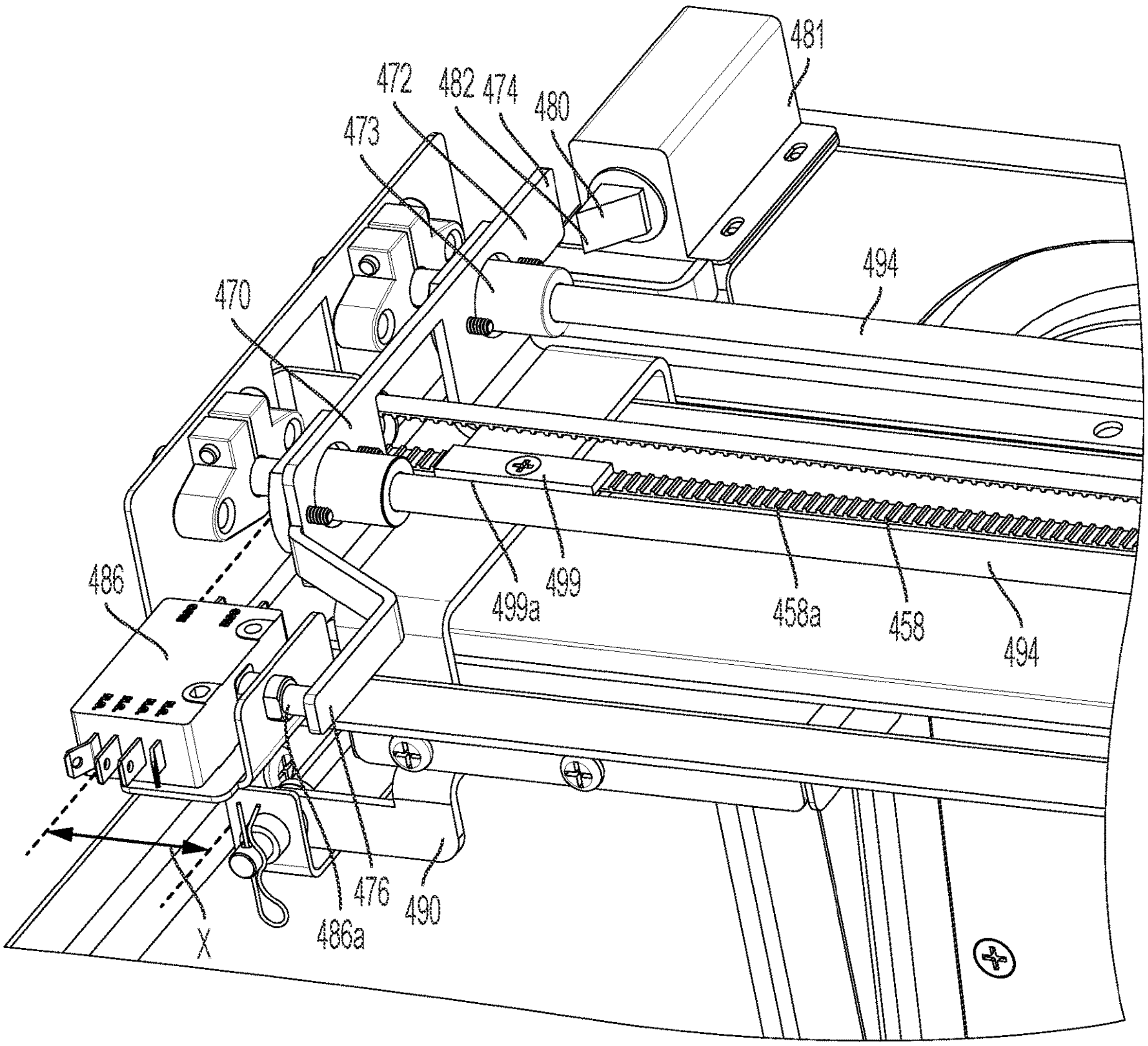
FIG. 19*c* is a further detail view of the view of FIG. 19*b*.
Figure 20:
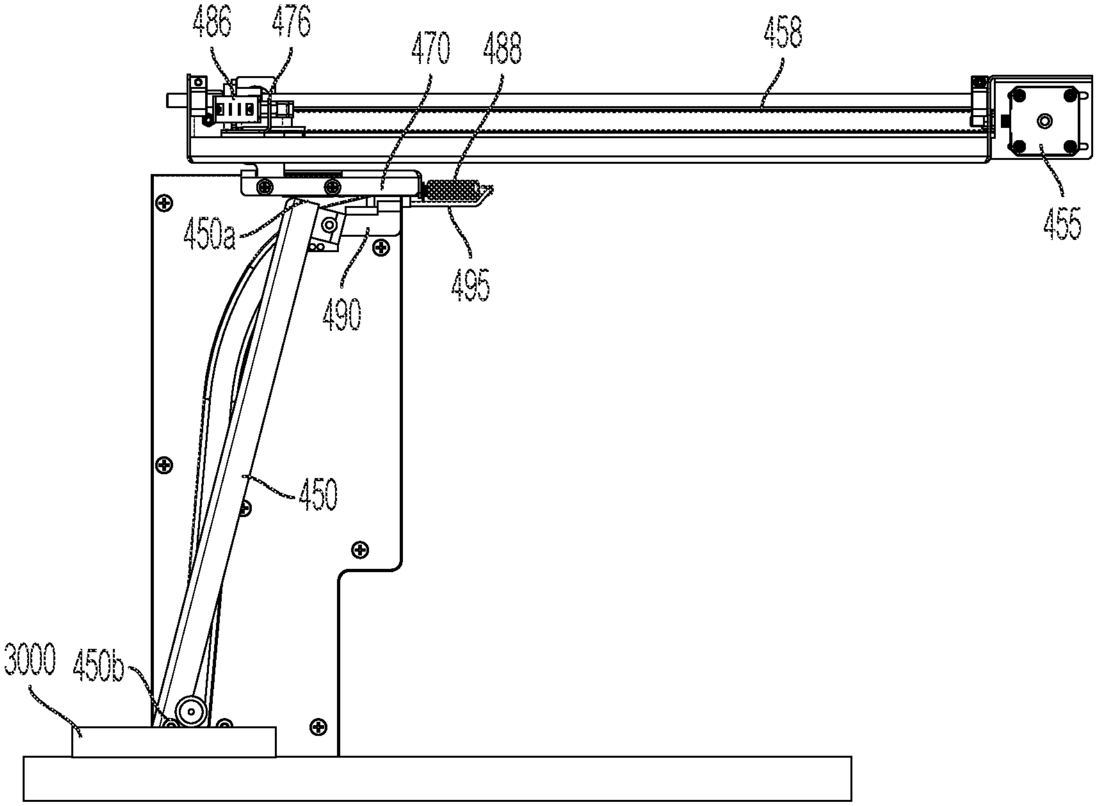
FIG. 20 is a side view of a compartment of FIG. 18 with an obstruction positioned below the lower edge of the door to block the door from reaching the fully closed position
Figure 20A:
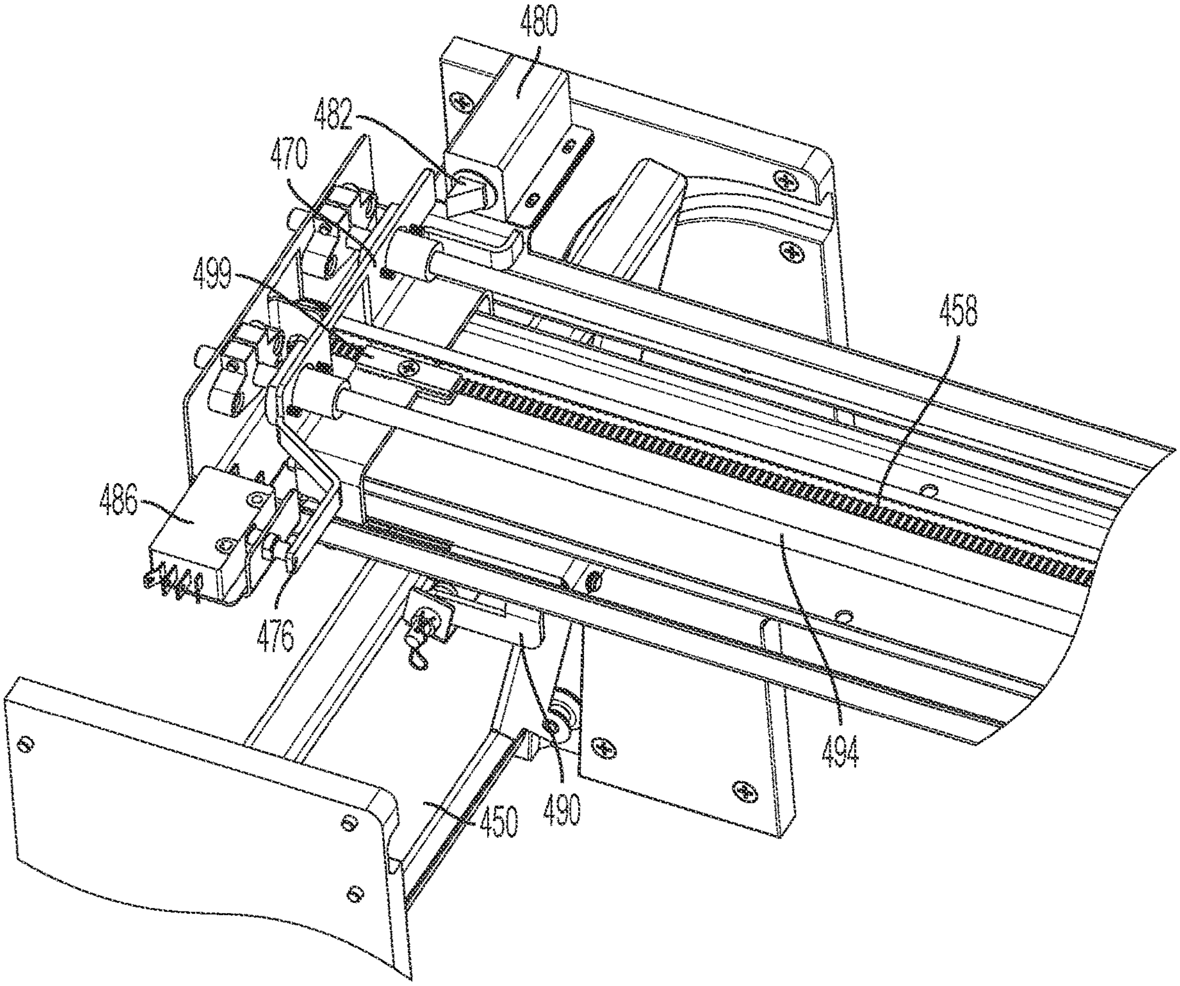
FIG. 20*a* is a detail perspective view of the orientation of FIG. 20.
Figure 20B:
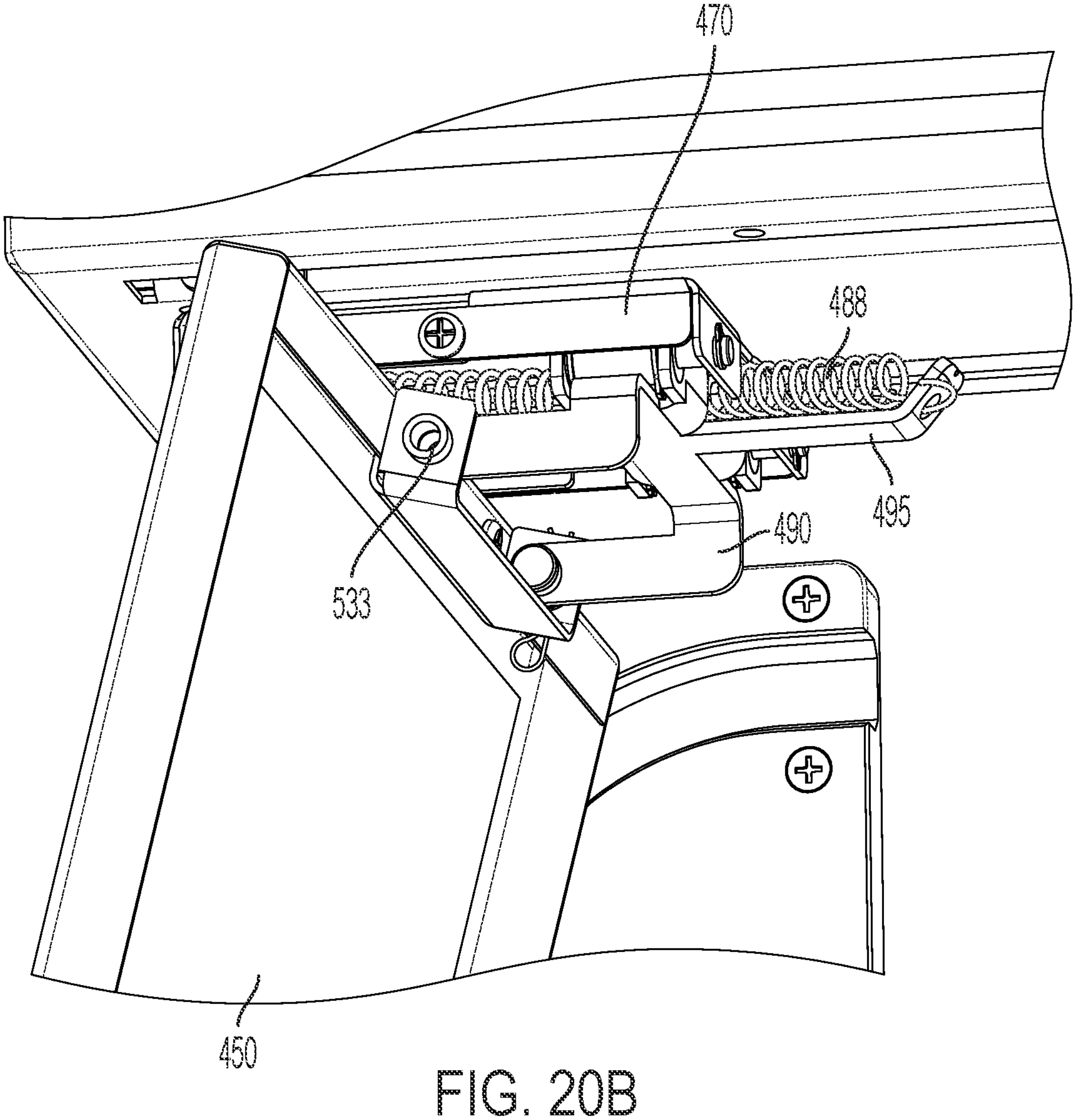
FIG. 20*b* is another detail perspective view of the orientation of FIG. 20.

Turning now to FIGS. 19*b* and 20*b*, a bracket 490 is provided and is connected to the door 450, preferably proximate to a top portion 450*a* of the door 450 with a pinned connection 533. The bracket 490 is movably supported by the carrier 470 such that the bracket 490 moves with movement of the carrier 470 between the forward and rear positions of the carrier 470, which causes the door 450 to also move between respective closed and open positions as the carrier 470 moves between the forward and rear positions.

In some embodiments, the carrier 470 includes one or more (2 in the depicted embodiment) shafts 478 and the bracket 490 including corresponding apertures through which the shafts 478 extend to constrain the position of the bracket 490 with respect to the carrier 470 to only allow relative longitudinal motion. The bracket 490 and the carrier 470 are connected with a spring 488, which biases the bracket 490 to a first position with respect to the carrier (corresponding to the door 450 being fully shut when the carrier 470 is in the fully forward position), but allows for relative linear motion of the bracket 490 with respect to the carrier 470 as constrained by the shafts 478. The bracket 490 may include an extended leg 495 that receives an end of the spring 488, which extends outside of the bounds of the remainder of the bracket 490, and establishes a distance for extension of the spring 488 as the bracket 490 moves with respect to the carrier 470, as discussed below.

FIG. 19*b* depicts a perspective view of the carrier 470 and the bracket 490 with the door in the closed position. FIG. 20*b* is a perspective view of the carrier 470 and the bracket 490 with the door 450 prevented from reaching the closed position due to an object 3000 (such as a box) disposed below the lower edge 450*b* of the door blocking the closure of the door (FIG. 20). In operation, the door 450 is moved from the open position (FIG. 18) to the closed position (FIG. 19) by rotating the motor shaft 456 to drive the belt 458, which causes the carrier 470 to slide linearly toward the forward end of the housing (as constrained by the shafts 494). The bracket 490 moves in the forward direction along with the carrier 470 due to the spring 488 urging the bracket 490 to move with the carrier 490. The door 450 moves toward the closed position as the door rides within the track 510. The track 510 is curved to cause the door to move from a position where it is exactly or generally parallel to the floor when in the open position to a position where it is exactly or generally perpendicular to the floor when in the closed position. The term "generally" is defined herein to mean within plus or minus 5% of a given dimension or a given angle.

When the belt 458 has moved sufficiently, the door approaches the closed position and has reached an orientation that is close to perpendicular to the floor due to the shape of the track. The finger 472 of the carrier 470 contacts the wedge surface 484 of the projection 482, which applies a force to the projection 482. A vector component of the force extends in a direction to urge the projection 482 inwardly to allow the finger 472 to continue moving past the projection, and when the finger 272 is clear of the projection the projection returns to its normal extended position though the path of motion of the finger 272.

If the door 450 contacts an object 3000 that is below the door before the door has reached the fully closed position (depicted in FIG. 20), the carrier 470 continues to move, with belt 458 motion, but the door 450 is prevented from moving, which also stops the bracket 490 from moving along with the carrier 470. With continued motion of the carrier 470, the bracket 490 allows continued movement of the carrier 470 (by the shafts 478 moving through apertures in the bracket 490) and the spring 488 is extended with the continued motion of the carrier, as shown in FIGS. 20 and 20*b* (with the lengthened spring 488 depicted schematically for simplicity). The extension of the spring 488 applies a force (proportional to the length of spring extension and the spring constant) to urge the carrier and bracket to return to their normal position. With continued motion of the carrier 470, the arm 476 of the carrier 470 reaches the position sensor 486, which causes the motor 455 to stop rotating, causing the carrier 470 to stop moving.

While the spring force and the weight of the door 450 interact with the object 3000 disposed below the door, the system may be designed such that the force that the door applies to the object is limited to avoid any injury or damage to the object 3000 below the door, especially if the object is for example a user's hand or finger.

When the object 3000 is withdrawn from below the door, the spring 3000 urges the bracket to slide along the carrier 470 (as constrained by the shafts 478) to allow the door to reach the fully closed position (FIG. 19).

The lock 480, as discussed above, prevents the door 450 from being manually opened a distance greater than the allowed relative travel between the carrier 470 and the bracket 490. Specifically, when the door 450 is in the fully closed position, a user may be able to apply an upward force to the door 450, which causes the bracket 490 to slide and also causes the carrier 470 to slide with the force of the bracket 490 transferred to the carrier 470 by the spring 488. The carrier 470 with a small amount of motion in the rear direction contacts the projection 482 that extends within the path of the finger 472, which prevents further motion of the carrier 470. As the door 450 is continued to be raised, the bracket 490 moves with respect to the carrier 470 but the door begins to feel resistance to motion as the spring 488 expands. Eventually, the bracket 490 is prevented from further movement due to the bracket's relative motion with the carrier causing the bracket 490 to reach the end of the shafts 476, which prevents further movement of the door 450. When the door 450 is released, the door returns to the closed position due to the weight of the door as well as the force of the spring 488 returning the bracket 490 to the normal position with respect to the carrier 470. One or ordinary skill in the art with a thorough review of this specification will understand how to design the door 450, carrier 470, bracket 490, and spring 488 to allow the protection and injury prevention benefits (discussed herein) when the door is mechanically blocked by an object below the door when the door is being closed, as discussed above, while minimizing the amount that the door 450 can be opened manually when the door is in the closed position to prevent the door from being opened manually by a person at the cabinet—such that typical objects that are intended to be stored within the cabinet when the door is closed cannot be removed from the cabinet when the door is manually opened the amount as possible due to the design of the carrier 470 and the bracket 490.

In some embodiments, the housing may include a recess 550 positioned within the floor 403 below the door at the front of the housing such that the lower portion 450*b* of the door enters the recess 550 when in the closed position, which prevents the user from easily being able to slide or wedge a member (such as a screw driver) below the bottom edge of the door 450 to prevent or make it more difficult for a person to attempt to manually lift the door in the open direction.

Figure 21:
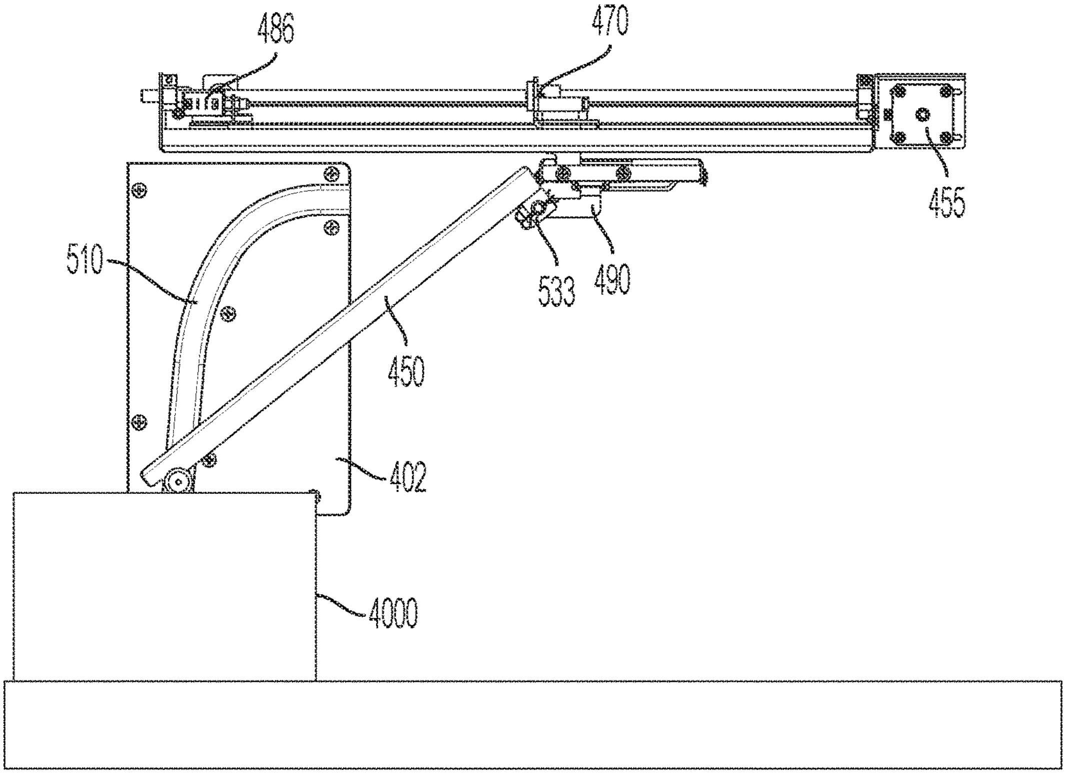
FIG. 21 is a side view of the compartment of FIG. 18 with an obstruction positioned below the lower edge of the door, with the door not yet reaching the lock and the position sensor, the obstruction preventing the door from traveling toward the fully closed position.
Figure 21A:
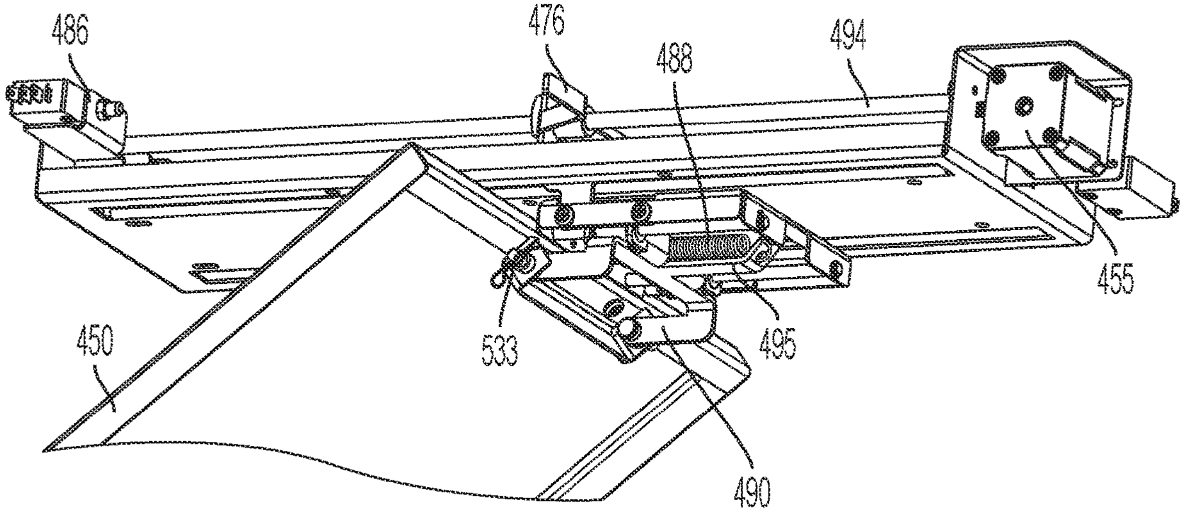
FIG. 21*a* is a perspective view of the view of FIG. 21.
Figure 21B:
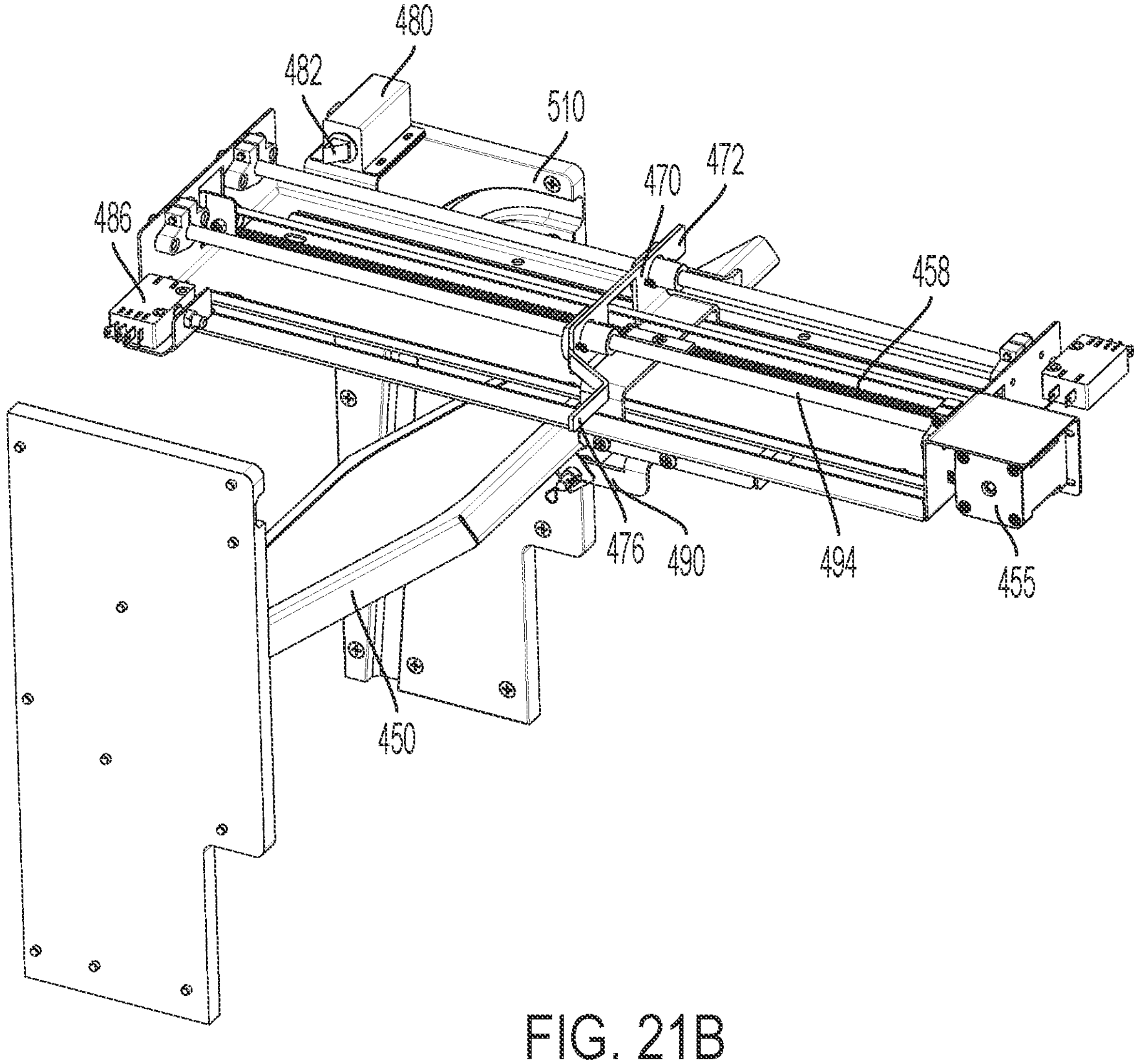
FIG. 21*b* is another perspective view of the view of FIG. 21.

Turning now to FIGS. 21-21*a*, the door 450 may encounter an object 4000 (schematically depicted in FIG. 21) that prevents further door motion in the closing direction before the carrier 470 reaches the projection 482 and the sensor 486. In this case, the object 4000 prevents door motion, which causes the bracket 490 to discontinue moving linearly with the carrier 470, thereby extending the length of the spring 488 as the carrier 470 continues to move forwardly with motion of the belt 458. With continued motion, the carrier 470 reaches the full extent of possible relative travel with respect to the bracket 490 (as constrained by the length of the shaft 478) and therefore the carrier 470 no longer moves, which also binds the belt 458 from further movement. This force applied to the carrier 470 by the spring (in a direction opposite to belt 458 motion) is applied to the belt and causes the belt to apply a resistive torque to the motor shaft 456, which is sensed by the motor 455. Upon sensing this resistive torque, the motor 455 discontinues rotating its shaft 456, and in some embodiments sends a signal to the controller 2000 about this occurrence, which may provide an alarm to the user via the input device (upon the housing or the remote input device). Once the object 4000 that obstructed movement of the door is removed, the user may provide an input that is received by the controller, which again allows the motor 455 to begin again rotating the shaft 456 in the direction to continue closing the door.

Certain aspects of the disclosure are embodied by the following numbered paragraphs:

Numbered Paragraph 1: A system for opening and closing a door within a cabinet, comprising:

- a motor supported upon one or more walls of a cabinet, the motor comprising a motor shaft, the motor in communication with a controller wherein the motor is configured to rotate the motor shaft in a first direction upon receipt of a first signal from the controller and the motor is configured to rotate the motor shaft in a second direction upon receipt of a second signal from the controller, wherein rotation of the motor shaft in the first direction causes a door to move in a direction associated with transferring the door from a closed position toward an open position and wherein rotation of the motor shaft in the second direction causes the door to move in a direction associated with transferring the door from the open position toward the closed position;
- a first plate fixed to the motor shaft to rotate with rotation of the motor shaft, the plate comprises a slot disposed therein;
- a first leg that extends from a door that extends through the slot;
- a second leg that extends from the door;
- a first sensor that moves based upon rotation of the motor shaft, wherein the first sensor can detect relative motion between the motor shaft and the door, wherein when the motor shaft is rotated in the second direction and the first sensor detects relative motion between the motor shaft and the door, the first sensor sends a signal to the controller, wherein upon receipt of the signal the first sensor discontinues sending the second signal to the motor.

Numbered Paragraph 2: The system of Numbered Paragraph 1, wherein the sensor includes a tongue that extends in a cantilevered manner therefrom and engages the second leg, wherein when the first sensor moves with respect to the second leg, the tongue mechanically engages an input component in the first sensor, wherein engagement of the input component causes the first sensor to detect the relative motion between the motor shaft and the door and send the signal to the controller.

Numbered Paragraph 3: The system of Numbered Paragraph 2, wherein the first sensor is fixed to a second plate that is fixed to the motor shaft to rotate with rotation of the motor shaft, wherein the motor shaft includes a first portion that extends in a first direction from a motor housing and is fixed to the first plate, the motor shaft includes a second portion that extends in an opposite second direction from the motor housing and is fixed to the second plate.

Numbered Paragraph 4: The system of any one of Numbered Paragraphs 1-3, further comprising second and third sensors, wherein the second sensor is configured to identify and send a signal to the controller when the door is in or is in close proximity to the closed position, and the third sensor is configured to identify and send a signal to the controller when the door is in or is in close proximity to the open position, wherein the second leg moves with respect to the second and third sensors and engagement between the second leg and the second and third sensors causes the respective second and third sensor to identify and send the respective signal.

Numbered Paragraph 5: The system of Numbered Paragraph 4, wherein when second sensor identifies that the door is in or is in close proximity to the closed position, the controller is able to send the first signal to the motor but is unable to send the second signal to the motor.

Numbered Paragraph 6: The system of Numbered Paragraph 5, wherein when the third sensor identifies that the door is in or is in close proximity to the open position, the controller is able to send the second signal to the motor but is unable to send the first signal to the motor.

Numbered Paragraph 7: The system of any one of Numbered Paragraphs 1-6, wherein the engagement of the first leg within the slot allows the motor shaft to move between about 10 to 20 degrees of rotation with respect to the door.

Numbered Paragraph 8: The system of Numbered Paragraph 2, further comprising a spring disposed between the first plate and the door to urge engagement between the first leg and a first end of the slot due to a biasing force of the spring, wherein when the motor is rotated in second direction and the door is prevented from rotating, the first leg slides within the slot toward the opposite second end of the slot and against the biasing force of the spring, and wherein with continued rotation of the motor shaft in the second direction, the second leg applies a force to the tongue of the first sensor which moves the tongue into engagement with and to apply a force to the input component of the first sensor.

Numbered Paragraph 9: The system of any one of Numbered Paragraphs 1-8, further comprising a door rotatably mounted to the one or more walls of the cabinet, and capable of being moved between the open and closed positions with rotation of the motor shaft.

Numbered Paragraph 10: A cabinet with a plurality of storage compartments, comprising:

- a housing comprising a plurality of walls that define two or more compartments to receive items therein,
- two or more doors that are rotatably mounted to the housing with the plurality of doors selectively enclosing or opening the respective two or more compartments;
- two or more motor assemblies that are each operably connected between one or more of the plurality of walls and a respective door, wherein each motor assembly comprises:

a motor with a motor shaft, the motor fixed to the one or more of the plurality of walls, the motor in communication with a controller wherein the motor is configured to rotate the motor shaft in a first direction upon receipt of a first signal from the controller and the motor is configured to rotate the motor shaft in a second direction upon receipt of a second signal from the controller, wherein rotation of the motor shaft in the first direction causes the respective door to move in a direction associated with transferring the door from a closed position toward an open position and wherein rotation of the motor shaft in the second direction causes the door to move in a direction associated with transferring the door from the open position toward the closed position;

a first plate fixed to the motor shaft to rotate with rotation of the motor shaft, the plate comprises a slot disposed therein;

a first leg that extends from the respective door that extends through the slot;

a second leg that extends from the respective door;

a first sensor that moves based upon rotation of the motor shaft, wherein the first sensor can detect relative motion between the motor shaft and the respective door, wherein when the motor shaft is rotated in the second direction and the first sensor detects relative motion between the motor shaft and the door, the first sensor sends a signal to the controller, wherein upon receipt of the signal the first sensor discontinues sending the second signal to the motor.

Numbered Paragraph 11: The system of Numbered Paragraph 10, wherein the first sensor within each of the plurality of motor assemblies includes a tongue that extends in a cantilevered manner therefrom and engages the second leg, wherein when the first sensor moves with respect to the second leg, the tongue mechanically engages an input component in the first sensor, wherein engagement of the input component causes the first sensor to detect the relative motion between the motor shaft and the door and send the signal to the controller.

Numbered Paragraph 12: The system of either of Numbered Paragraphs 10 or 11, wherein the first sensor is fixed to a second plate that is fixed to the motor shaft to rotate with rotation of the motor shaft, wherein the motor shaft includes a first portion that extends in a first direction from a motor housing and is fixed to the first plate, the motor shaft includes a second portion that extends in an opposite second direction from the motor housing and is fixed to the second plate.

Numbered Paragraph 13: The system of any one of Numbered Paragraphs 10-12, wherein each of the two or more motor assemblies comprises second and third sensors that are fixed to one or more of the plurality of walls, wherein the second sensor is configured to identify and send a signal to the controller when the door is in or is in close proximity to the closed position, and the third sensor is configured to identify and send a signal to the controller when the door is in or is in close proximity to the open position, wherein the second leg moves with respect to the second and third sensors and engagement between the second leg and the second and third sensors causes the respective sensor to identify and send the respective signal.

Numbered Paragraph 14: The system of Numbered Paragraph 13, wherein when second sensor identifies that the door is in or is in close proximity to the closed position, the controller is able to send the first signal to the motor but is unable to send the second signal to the motor.

Numbered Paragraph 15: The system of Numbered Paragraph 14, wherein when the third sensor identifies that the door is in or is in close proximity to the open position, the controller is able to send the second signal to the motor but is unable to send the first signal to the motor.

Numbered Paragraph 16: The system of any one of Numbered Paragraphs 10-15, wherein the engagement of the first leg within the slot allows the motor shaft to move between about 10 to 20 degrees of rotation with respect to the door.

Numbered Paragraph 17: The system of Numbered Paragraph 11, further comprising a spring disposed between the first plate and the door to urge engagement between the first leg and a first end of the slot due to a biasing force of the spring, wherein when the motor is rotated in second direction and the door is prevented from rotating, the first leg slides within the slot toward the opposite second end of the slot and against the biasing force of the spring, and wherein with continued rotation of the motor shaft in the second direction, the second leg applies a force to the tongue of the first sensor which moves the tongue into engagement with and to apply a force to the input component of the first sensor.

Numbered Paragraph 18 The system of any one of Numbered Paragraphs 10-17, wherein each of the two or more doors has a top portion that forms a top edge and a bottom portion that forms a bottom edge, wherein the housing comprises two or more of openings within the plurality of walls that allow communication into the respective two or more compartments, wherein each of the two or more openings include a top portion that includes a top edge and bottom portion upon which the bottom portion of the respective door rests when the respective door is in the closed position, wherein when the door is in the closed position the top edge of the door is spaced from the top edge of the opening, and wherein the door is spaced from the top edge of the opening throughout the range of motion of the door between the closed position and the open position.

Numbered Paragraph 19: The system of Numbered Paragraph 18, wherein the space between the top edge of the door and the top edge of the opening is at least 0.75 inches when the door is in the closed position and is at least 0.75 inches throughout the range of motion of the door between the closed position and the open position.

Numbered Paragraph 20: The system of any one of Numbered Paragraphs 10-19, wherein each of the two or more compartments each comprise a fourth sensor disposed therein, wherein the fourth sensor identifies when items are disposed within the respective compartment and when items are not disposed within the respective compartment, wherein the fourth sensor sends a signal to the controller based upon whether or not items are disposed within the respective compartment.

Numbered Paragraph 21: The system of Numbered Paragraph 20, wherein when the door associated with the respective compartment is in the open position and when the controller receives the signal from the fourth sensor to identify that items are disposed within the compartment the controller maintains the respective door in the open position, wherein when the controller receives the signal from the fourth sensor to identify that there are no items disposed within the respective compartment, the controller waits a preset time after receipt of the signal that there are no items disposed within the respective compartment and then the controller causes the motor assembly associated with the respective door and compartment to transfer the respective door from the open position to the closed position.

Numbered Paragraph 22: The system of Numbered Paragraph 21, wherein the fourth sensor includes a receiver and a transmitter that are disposed upon opposite walls of the plurality of walls that define the respective compartment, wherein the transmitter sends a light beam across an interior volume of the respective compartment that is directed toward the receiver, and wherein the fourth sensor identifies that there are no items disposed within the respective compartment when the light beam is received by the receiver, and the fourth sensor identifies that there are items disposed within the respective compartment when the collector does not receive the light beam.

Numbered Paragraph 23: The system of Numbered Paragraph 22, wherein the light beam is an infrared light beam.

Numbered Paragraph 24: The system of any one of Numbered Paragraphs 10-23, wherein when the controller receives the signal from the first sensor after detecting relative motion between the motor shaft and the respective door, the controller sends the first signal to the motor to cause the motor shaft to rotate in the first direction to move the respective door toward the open position.

Numbered Paragraph 25: A system for opening and closing a door within a cabinet, comprising:

a housing that movably supports a door to enable the door to transition between a fully closed position and an open position, the housing includes opposite first and second side walls, one or both of the first and second side walls includes a track along which a portion of the door moves as the door transitions between the fully closed and open positions;

the housing supports a motor, which is operatively engaged with a transmission, the transmission being aligned such that rotation of a motor shaft causes a carrier to linearly translate between a rear position and a forward position, wherein the door is in the open position when the carrier is in the rear position;

wherein the door is connected to a bracket, the bracket is configured to move linearly with respect to the carrier, a spring is connected between the carrier and the bracket, the spring biases the bracket to a forward position with respect to the carrier;

wherein when the carrier is urged in a forward direction and the door movement toward the fully closed position is blocked, the bracket is prevented from sliding with the carrier, which causes the spring to elongate as the carrier continues to move in the forward direction.

Numbered Paragraph 26: The system for opening and closing a door within a cabinet of Numbered Paragraph 25, wherein the door is connected to the bracket with a pinned connection to allow the door to pivot with respect to the bracket.

Numbered Paragraph 27: The system for opening and closing a door within a cabinet of either of Numbered Paragraphs 25 or 26, further comprising a lock to prevent the door from fully opening, wherein the lock includes a projection that movably extends from the housing and wherein the carrier includes a finger that is aligned with the projection along the path of travel of the finger between rear position and the forward position.

Numbered Paragraph 28: The system for opening and closing a door within a cabinet of Numbered Paragraph 27, wherein when the lock is engaged, the projection extends into the path of travel of the finger, such that when the carrier is in the forward position the projection blocks travel of the finger and carrier in the rearward direction.

Numbered Paragraph 29: The system for opening and closing a door within a cabinet of Numbered Paragraph 28, wherein the projection continues to block the carrier when the carrier is in the forward position until a signal is generated to allow the door to be opened, whereby the projection is translated to withdraw from the position that blocks travel of the finger and carrier.

Numbered Paragraph 30: The system for opening and closing a door within a cabinet of either of Numbered Paragraphs 28 or 29, wherein the projection includes a wedge surface that faces a rear portion of the housing, such that when the finger contacts the wedge surface of the projection as the finger travels toward the forward position, the finger provides a force upon the wedge surface that has a vector component that urges the projection to withdraw from the position that blocks forward motion of the finger past the projection.

Numbered Paragraph 31: The system for opening and closing a door within a cabinet of any one of Numbered Paragraphs 25-30, wherein the housing supports a position sensor that identifies when the carrier reaches the forward position, carrier includes an arm that contacts the position sensor when the carrier is in the forward position and removes contact from the sensor when the carrier is in any position other than the forward position.

Numbered Paragraph 32: The system for opening and closing a door within a cabinet of Numbered Paragraph 31, wherein the arm extends along a plane that is parallel to but spaced in a rearward direction from a plane that extends through the carrier.

Numbered Paragraph 33: The system for opening and closing a door within a cabinet of any one of Numbered Paragraphs 25-32, wherein the transmission is a belt drive, wherein the belt wraps around a motor shaft and a idler pinion proximate to a front opening in the housing, wherein the carrier is fixed to the belt to translate as the belt translates with rotation of the motor shaft.

Numbered Paragraph 34: The system for opening and closing a door within a cabinet of any one of Numbered Paragraphs 27-30, wherein the housing supports a position sensor that identifies when the carrier reaches the forward position, the carrier includes an arm that contacts the position sensor when the carrier is in the forward position and removes contact from the sensor when the carrier is in any position other than the forward position, and wherein the arm extends along a plane that is parallel to but spaced in a rearward direction from a plane that extends through the carrier, wherein a controller receives a signal from the position sensor when the carrier reaches the forward position and the arm engages the position sensor, wherein when the controller receives the signal from the position sensor that the carrier has reached the forward position, the controller is capable of maintaining the lock in the position with the projection extending into the path of travel of the finger to prevent the finger and the carrier from translating in the rearward direction.

Numbered Paragraph 35: The system for opening and closing a door within a cabinet of Numbered Paragraph 34, wherein the controller is in communication with a user, wherein the controller is configured to maintain the lock engaged until the controller receives a signal to disengage the lock.

Numbered Paragraph 36: The system for opening and closing a door within a cabinet of Numbered Paragraph 35, wherein the signal to disengage the lock may be received from one or more of a user input unit on the housing, a remote signal received through a network.

Numbered Paragraph 37: The system of opening and closing a door within a cabinet of any one of Numbered Paragraphs 31-36, wherein when the door movement toward the fully closed position is blocked in a position where the finger of the carrier has not engaged the position sensor, movement of the carrier in the forward direction is prevented due to the application of the resistive torque from the belt to the motor shaft, wherein when the carrier is prevented from forward movement the belt is also prevented from translation, which applies the resistive torque to the motor shaft.

Numbered Paragraph 38: A system for opening and closing a door within a cabinet, comprising:

- a housing that movably supports a door to enable the door to transition between a fully closed position and an open position, the housing includes opposite first and second side walls, one or both of the first and second side walls includes a track along which a portion of the door moves as the door transitions between the fully closed and open positions;
- the housing supports a motor, which is operatively engaged with a transmission, the transmission being aligned such that rotation of a motor shaft causes a carrier to linearly translate between a rear position and a forward position, wherein the door is in the open position when the carrier is in the rear position;
- wherein the door is connected to a bracket, the bracket is configured to move linearly with respect to the carrier, a spring is connected between the carrier and the bracket, the spring biases the bracket to a forward position with respect to the carrier;
- wherein when the carrier is urged in a forward direction and the door movement toward the fully closed position is blocked, the bracket is prevented from sliding with the carrier, which causes the spring to elongate as the carrier continues to move in the forward direction.

Numbered Paragraph 39: The system for opening and closing a door within a cabinet of Numbered Paragraph 38, wherein the door is connected to the bracket with a pinned connection to allow the door to pivot with respect to the bracket.

Numbered Paragraph 40: The system for opening and closing a door within a cabinet of Numbered Paragraph 38, further comprising a lock to prevent the door from fully opening, wherein the lock includes a projection that movably extends from the housing and wherein the carrier includes a finger that is aligned with the projection along the path of travel of the finger between rear position and the forward position.

Numbered Paragraph 41: The system for opening and closing a door within a cabinet of Numbered Paragraph 40, wherein when the lock is engaged, the projection extends into the path of travel of the finger, such that when the carrier is in the forward position the projection blocks travel of the finger and carrier in the rearward direction.

Numbered Paragraph 42: The system for opening and closing a door within a cabinet of Numbered Paragraph 41, wherein the projection continues to block the carrier when the carrier is in the forward position until a signal is generated to allow the door to be opened, whereby the projection is translated to withdraw from the position that blocks travel of the finger and carrier.

Numbered Paragraph 43: The system for opening and closing a door within a cabinet of Numbered Paragraph 41, wherein the projection includes a wedge surface that faces a rear portion of the housing, such that when the finger contacts the wedge surface of the projection as the finger travels toward the forward position, the finger provides a force upon the wedge surface that has a vector component that urges the projection to withdraw from the position that blocks forward motion of the finger past the projection.

Numbered Paragraph 44: The system for opening and closing a door within a cabinet of claim 38, wherein the housing supports a position sensor that identifies when the carrier reaches the forward position, carrier includes an arm that contacts the position sensor when the carrier is in the forward position and removes contact from the sensor when the carrier is in any position other than the forward position.

Numbered Paragraph 45: The system for opening and closing a door within a cabinet of Numbered Paragraph 44, wherein the arm extends along a plane that is parallel to but spaced in a rearward direction from a plane that extends through the carrier.

Numbered Paragraph 46: The system for opening and closing a door within a cabinet of Numbered Paragraph 38, wherein the transmission is a belt drive, wherein the belt wraps around a motor shaft and a idler pinion proximate to a front opening in the housing, wherein the carrier is fixed to the belt to translate as the belt translates with rotation of the motor shaft.

Numbered Paragraph 47: The system for opening and closing a door within a cabinet of Numbered Paragraph 40, wherein the housing supports a position sensor that identifies when the carrier reaches the forward position, the carrier includes an arm that contacts the position sensor when the carrier is in the forward position and removes contact from the sensor when the carrier is in any position other than the forward position, and wherein the arm extends along a plane that is parallel to but spaced in a rearward direction from a plane that extends through the carrier,

- wherein a controller receives a signal from the position sensor when the carrier reaches the forward position and the arm engages the position sensor, wherein when the controller receives the signal from the position sensor that the carrier has reached the forward position, the controller is capable of maintaining the lock in the position with the projection extending into the path of travel of the finger to prevent the finger and the carrier from translating in the rearward direction.

Numbered Paragraph 48: The system for opening and closing a door within a cabinet of Numbered Paragraph 47, wherein the controller is in communication with a user, wherein the controller is configured to maintain the lock engaged until the controller receives a signal to disengage the lock.

Numbered Paragraph 49: The system for opening and closing a door within a cabinet of Numbered Paragraph 48, wherein the signal to disengage the lock may be received from one or more of a user input unit on the housing, a remote signal received through a network.

Numbered Paragraph 50: The system of opening and closing a door within a cabinet of Numbered Paragraph 44, wherein when the door movement toward the fully closed position is blocked in a position where the finger of the carrier has not engaged the position sensor, movement of the carrier in the forward direction is prevented due to the application of the resistive torque from the belt to the motor shaft, wherein when the carrier is prevented from forward movement the belt is also prevented from translation, which applies the resistive torque to the motor shaft.

While the preferred embodiments of the disclosed have been described, it should be understood that the invention is not so limited and modifications may be made without departing from the disclosure. The scope of the disclosure is defined by the appended claims, and all devices that come within the meaning of the claims, either literally or by equivalence, are intended to be embraced therein.

The invention claimed is:

1. A system for opening and closing a door within a cabinet, comprising:

a motor supported upon one or more walls of a cabinet, the motor comprising a motor shaft, the motor in communication with a controller wherein the motor is configured to rotate the motor shaft in a first direction upon receipt of a first signal from the controller and the motor is configured to rotate the motor shaft in a second direction upon receipt of a second signal from the controller, wherein rotation of the motor shaft in the first direction causes a door to move in a direction associated with transferring the door from a closed position toward an open position and wherein rotation of the motor shaft in the second direction causes the door to move in a direction associated with transferring the door from the open position toward the closed position;

an inner plate fixed to the motor shaft to rotate with rotation of the motor shaft, the inner plate comprises a slot disposed therein;

a first leg that extends from a door that extends through the slot;

a second leg that extends from the door;

a safety sensor that moves based upon rotation of the motor shaft, wherein the safety sensor is fixed to an outer plate that is fixed to the motor shaft to rotate with rotation of the motor shaft such that the safety sensor moves in an arc with a circumference of the outer plate, wherein the safety sensor can detect relative motion between the motor shaft and the door by engaging the second leg when there is relative motion between the motor shaft and the door, wherein when the motor shaft is rotated in the second direction and the safety sensor detects relative motion between the motor shaft and the door, the safety sensor sends a signal to the controller, wherein upon receipt of the signal the safety sensor discontinues sending the second signal to the motor.

2. The system of claim 1, wherein the safety sensor includes a tongue that extends in a cantilevered manner therefrom and engages the second leg, wherein when the safety sensor engages the second leg, the tongue mechanically engages an input component in the safety sensor, wherein engagement of the input component causes the safety sensor to detect the relative motion between the motor shaft and the door and send the signal to the controller.

3. The system of claim 2, wherein the motor shaft includes a first portion that extends in a first direction from a motor housing and is fixed to the inner plate, the motor shaft includes a second portion that extends in an opposite second direction from the motor housing and is fixed to the outer plate.

4. The system of claim 1, further comprising a first door position sensor and a second door position sensor, wherein the first door position sensor is configured to identify and send a signal to the controller when the door is in or is in close proximity to the closed position, and the second door position sensor is configured to identify and send a signal to the controller when the door is in or is in close proximity to the open position, wherein the second leg moves with respect to the first and second sensors and engagement between the second leg and the first door position sensor and the second door position sensor causes the respective first door position sensor and the second door position sensor to identify and send the respective signal.

5. The system of claim 4, wherein when the first door position sensor identifies that the door is in or is in close proximity to the closed position, the controller is configured to send the first signal to the motor [but] and is configured to not send the second signal to the motor.

6. The system of claim 5, wherein when the second door position sensor identifies that the door is in or is in close proximity to the open position by engaging the second leg, the controller is configured to send the second signal to the motor and is configured to not send the first signal to the motor.

7. The system of claim 1, wherein the engagement of the first leg within the slot allows the motor shaft to move between about 10 to 20 degrees of rotation with respect to the door.

8. The system of claim 2, further comprising a spring disposed between the inner plate and the door to urge engagement between the first leg and a first end of the slot due to a biasing force of the spring, wherein when the motor is rotated in second direction and the door is prevented from rotating, the first leg slides within the slot toward the opposite second end of the slot and against the biasing force of the spring, and wherein with continued rotation of the motor shaft in the second direction, the second leg applies a force to the tongue of the safety sensor which moves the tongue into engagement with and to apply a force to the input component of the safety sensor.

9. The system of claim 1, further comprising a door rotatably mounted to the one or more walls of the cabinet, and capable of being moved between the open and closed positions with rotation of the motor shaft.

10. A cabinet with a plurality of storage compartments, comprising:

a housing comprising a plurality of walls that define two or more compartments to receive items therein, two or more doors that are rotatably mounted to the housing with the plurality of doors selectively enclosing or opening the respective two or more compartments;

two or more motor assemblies each operably connected between one or more of the plurality of walls and a respective door, wherein each motor assembly comprises:

a motor with a motor shaft, the motor fixed to the one or more of the plurality of walls, the motor in communication with a controller wherein the motor is configured to rotate the motor shaft in a first direction upon receipt of a first signal from the controller and the motor is configured to rotate the motor shaft in a second direction upon receipt of a second signal from the controller, wherein rotation of the motor shaft in the first direction causes the respective door to move in a direction associated with transferring the door from a closed position toward an open position and wherein rotation of the motor shaft in the second direction causes the door to move in a direction associated with transferring the door from the open position toward the closed position;

an inner plate fixed to the motor shaft to rotate with rotation of the motor shaft, the inner plate comprises a slot disposed therein;

a first leg that extends from the respective door that extends through the slot;

a second leg that extends from the respective door;

a safety sensor that moves based upon rotation of the motor shaft, wherein the safety sensor is fixed to an outer plate that is fixed to the motor shaft to rotate with rotation of the motor shaft such that the safety sensor moves in an arc with a circumference of the outer plate, wherein the safety sensor can detect relative motion between the motor shaft and the door by engaging the second leg when there is relative motion between the motor shaft and the door, wherein when the motor shaft is rotated in the second direction and the safety sensor detects relative motion between the motor shaft and the door, the safety sensor sends a signal to the controller, wherein upon receipt of the signal the safety sensor discontinues sending the second signal to the motor.

11. The system of claim 10, wherein the safety sensor within each of the plurality of motor assemblies includes a tongue that extends in a cantilevered manner therefrom and engages the second leg, wherein when the safety sensor engages the second leg, the tongue mechanically engages an input component in the safety sensor, wherein engagement of the input component causes the safety sensor to detect the relative motion between the motor shaft and the door and send the signal to the controller.

12. The system of claim 11, wherein the motor shaft includes a first portion that extends in a first direction from a motor housing and is fixed to the inner plate, the motor shaft includes a second portion that extends in an opposite second direction from the motor housing and is fixed to the outer plate.

13. The system of claim 10, wherein each of the two or more motor assemblies comprises a first door position sensor and a second door position sensor that are fixed to one or more of the plurality of walls, wherein the first door position sensor is configured to identify and send a signal to the controller when the door is in or is in close proximity to the closed position, and the second door position sensor is configured to identify and send a signal to the controller when the door is in or is in close proximity to the open position, wherein the second leg moves with respect to the first door position sensor and the second door position sensor and engagement between the second leg and the first door position sensor and the second door position sensor causes the respective door position sensor to identify and send the respective signal.

14. The system of claim 13, wherein when the first door position sensor identifies that the door is in or is in close proximity to the closed position, the controller is configured to send the first signal to the motor and is configured to not send the second signal to the motor.

15. The system of claim 14, wherein when the second door position sensor identifies that the door is in or is in close proximity to the open position, the controller is configured to send the second signal to the motor and is configured to not send the first signal to the motor.

16. The system of claim 10, wherein the engagement of the first leg within the slot allows the motor shaft to move between about 10 to 20 degrees of rotation with respect to the door.

17. The system of claim 11, further comprising a spring disposed between the inner plate and the door to urge engagement between the first leg and a first end of the slot due to a biasing force of the spring, wherein when the motor is rotated in second direction and the door is prevented from rotating, the first leg slides within the slot toward the opposite second end of the slot and against the biasing force of the spring, and wherein with continued rotation of the motor shaft in the second direction, the second leg applies a force to the tongue of the safety sensor which moves the tongue into engagement with and to apply a force to the input component of the safety sensor.

18. The system of claim 10, wherein each of the two or more doors has a top portion that forms a top edge and a bottom portion that forms a bottom edge, wherein the housing comprises two or more of openings within the plurality of walls that allow communication into the respective two or more compartments, wherein each of the two or more openings include a top portion that includes a top edge and bottom portion upon which the bottom portion of the respective door rests when the respective door is in the closed position, wherein when the door is in the closed position the top edge of the door is spaced from the top edge of the opening, and wherein the door is spaced from the top edge of the opening throughout the range of motion of the door between the closed position and the open position.

19. The system of claim 18, wherein the space between the top edge of the door and the top edge of the opening is at least 0.75 inches when the door is in the closed position and is at least 0.75 inches throughout the range of motion of the door between the closed position and the open position.

20. The system of claim 10, wherein each of the two or more compartments each comprise a sensing system disposed therein, wherein the sensing system identifies when items are disposed within the respective compartment and when items are not disposed within the respective compartment, wherein the sensing system sends a signal to the controller based upon whether or not items are disposed within the respective compartment.

21. The system of claim 20, wherein when the door associated with the respective compartment is in the open position and when the controller receives the signal from the sensing system to identify that items are disposed within the compartment the controller maintains the respective door in the open position, wherein when the controller receives the signal from the sensing system to identify that there are no items disposed within the respective compartment, the controller waits a preset time after receipt of the signal that there are no items disposed within the respective compartment and then the controller causes the motor assembly associated with the respective door and compartment to transfer the respective door from the open position to the closed position.

22. The system of claim 21, wherein the sensing system includes a receiver and a transmitter that are disposed upon opposite walls of the plurality of walls that define the respective compartment, wherein the transmitter sends a light beam across an interior volume of the respective compartment that is directed toward the receiver, and wherein the sensing system identifies that there are no items disposed within the respective compartment when the light beam is received by the receiver, and the sensing system identifies that there are items disposed within the respective compartment when the collector does not receive the light beam.

23. The system of claim 22, wherein the light beam is an infrared light beam.

24. The system of claim 10, wherein when the controller receives the signal from the safety sensor after detecting relative motion between the motor shaft and the respective door, the controller sends the first signal to the motor to cause the motor shaft to rotate in the first direction to move the respective door toward the open position.

25. A system for opening and closing a door within a cabinet, comprising:

a motor assembly disposed upon one or more walls of a cabinet, the motor assembly comprising a motor with a motor shaft, an inner plate fixed to the motor shaft, and a rigid plate, wherein the wherein the rigid plate is fixed to one of the one or more walls of the cabinet, the motor in communication with a controller wherein the motor is configured to rotate the motor shaft in a first direction upon receipt of a first signal from the controller and the motor is configured to rotate the motor shaft in a second direction upon receipt of a second signal from the controller, wherein rotation of the motor shaft in the first direction causes a door to move in a direction associated with transferring the door from a closed position toward an open position and wherein rotation of the motor shaft in the second direction causes the door to move in a direction associated with transferring the door from the open position toward the closed position;

the inner plate is fixed to the motor shaft to rotate with rotation of the motor shaft, the inner plate comprises a slot disposed therein;

a first leg that extends from a door and extends through the slot;

a second leg that extends from the door and extends through a second slot in the rigid plate;

a safety sensor that moves based upon rotation of the motor shaft, wherein the safety sensor is fixed to an outer plate that is fixed to the motor shaft to rotate with rotation of the motor shaft such that the safety sensor moves in an arc with a circumference of the outer plate, wherein the safety sensor can detect relative motion between the motor shaft and the door by engaging the second leg when there is relative motion between the motor shaft and the door, wherein when the motor shaft is rotated in the second direction and the safety sensor detects relative motion between the motor shaft and the door, the safety sensor sends a signal to the controller, wherein upon receipt of the signal the safety sensor discontinues sending the second signal to the motor.

26. A cabinet with a plurality of storage compartments, comprising:

a housing comprising a plurality of walls that define two or more compartments to receive items therein, two or more doors that are rotatably mounted to the housing with the plurality of doors selectively enclosing or opening the respective two or more compartments;

two or more motor assemblies each operably connected between one or more of the plurality of walls and a respective door, wherein each motor assembly comprises:

a motor with a motor shaft, the motor disposed upon the one or more of the plurality of walls, the motor in communication with a controller wherein the motor is configured to rotate the motor shaft in a first direction upon receipt of a first signal from the controller and the motor is configured to rotate the motor shaft in a second direction upon receipt of a second signal from the controller, wherein rotation of the motor shaft in the first direction causes the respective door to move in a direction associated with transferring the door from a closed position toward an open position and wherein rotation of the motor shaft in the second direction causes the door to move in a direction associated with transferring the door from the open position toward the closed position;

an inner plate fixed to the motor shaft to rotate with rotation of the motor shaft, the inner plate comprises a slot disposed therein;

a first leg extends from the respective door and extends through the slot;

a second leg extends from the respective door;

a rigid plate fixed to one of the plurality of walls, the rigid plate comprising a second slot through which the second leg extends;

a safety sensor that moves based upon rotation of the motor shaft, wherein the safety sensor is fixed to an outer plate that is fixed to the motor shaft to rotate with rotation of the motor shaft such that the safety sensor moves in an arc with a circumference of the outer plate, wherein the safety sensor can detect relative motion between the motor shaft and the door by engaging the second leg when there is relative motion between the motor shaft and the door, wherein when the motor shaft is rotated in the second direction and the safety sensor detects relative motion between the motor shaft and the door, the safety sensor sends a signal to the controller, wherein upon receipt of the signal the safety sensor discontinues sending the second signal to the motor.

* * * * *